(12) United States Patent
Sommerfeld et al.

(10) Patent No.: US 11,271,269 B2
(45) Date of Patent: Mar. 8, 2022

(54) BATTERY PACK

(71) Applicant: MILWAUKEE ELECTRIC TOOL CORPORATION, Brookfield, WI (US)

(72) Inventors: Steven T. Sommerfeld, Mukwonago, WI (US); Benjamin D. Gall, Milwaukee, WI (US); Hui Shu Beldon Liu, Dongguan (CN)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 296 days.

(21) Appl. No.: 16/341,625

(22) PCT Filed: Oct. 14, 2016

(86) PCT No.: PCT/CN2016/102208
§ 371 (c)(1),
(2) Date: Apr. 12, 2019

(87) PCT Pub. No.: WO2018/068325
PCT Pub. Date: Apr. 19, 2018

(65) Prior Publication Data
US 2021/0167452 A1 Jun. 3, 2021

(51) Int. Cl.
*H01M 50/213* (2021.01)
*H01M 50/247* (2021.01)
(Continued)

(52) U.S. Cl.
CPC ....... *H01M 50/213* (2021.01); *H01M 50/247* (2021.01); *H01M 50/289* (2021.01); *H01M 50/543* (2021.01); *H01M 2220/30* (2013.01)

(58) Field of Classification Search
None
See application file for complete search history.

(56) References Cited

U.S. PATENT DOCUMENTS 5,065,082 A 11/1991 Fushiya
D335,277 S 5/1993 Hattori
(Continued)

FOREIGN PATENT DOCUMENTS

CN 104641165 A 5/2015
DE 19617805 11/1996
(Continued)

OTHER PUBLICATIONS

International Preliminary Report on Patentability for Application No. PCT/CN2016/102208 dated Jul. 24, 2017 (4 pages).

(Continued)

*Primary Examiner* — Kenneth J Douyette
(74) *Attorney, Agent, or Firm* — Michael Best & Friedrich LLP

(57) ABSTRACT

A battery pack and a method for connecting a battery pack to an electronic device to power to the electronic device (e.g., a headlamp, a flashlight, a flood light, a drill, a driver, etc.). The battery pack includes a generally cylindrical housing defined by an arcuate sidewall extending between a first end surface and a second end surface and defining an interior cavity configured to support at least one battery cell (e.g., a lithium-ion battery cell). The battery pack includes a first insertion alignment member engageable with a first battery alignment member of the electronic device in order to facilitate insertion into a receiving portion of the electronic device in a first direction and a second insertion alignment member engageable with a second battery alignment member of another electronic device in order to facilitate insertion into a receiving portion of the other electronic device in a second direction.

12 Claims, 34 Drawing Sheets

(51) Int. Cl.
  *H01M 50/289* (2021.01)
  *H01M 50/543* (2021.01)

(56) References Cited

U.S. PATENT DOCUMENTS

| | | | |
|---|---|---|---|
| D352,698 S | 11/1994 | Okumura | |
| 5,626,979 A | 5/1997 | Mitsui et al. | |
| 5,874,181 A | 2/1999 | Tam | |
| D413,565 S | 9/1999 | Nakayama | |
| D427,142 S | 6/2000 | Luh et al. | |
| D428,385 S | 7/2000 | Luh et al. | |
| 6,157,309 A * | 12/2000 | Mitsui | H01M 6/5066 340/636.1 |
| D459,297 S | 6/2002 | Searle | |
| 6,955,446 B2 | 10/2005 | Uke | |
| D530,277 S | 10/2006 | Lin | |
| D532,372 S | 11/2006 | Keating | |
| D539,216 S | 3/2007 | Hamaguchi | |
| D539,217 S | 3/2007 | Hamaguchi | |
| D543,143 S | 5/2007 | Hamaguchi | |
| 7,278,753 B2 | 10/2007 | Uke | |
| D557,658 S | 12/2007 | Ledbetter et al. | |
| 7,491,466 B2 | 2/2009 | Feddrix et al. | |
| D593,488 S | 6/2009 | Harrison et al. | |
| D598,374 S | 8/2009 | Sasada | |
| D598,844 S | 8/2009 | Harrison et al. | |
| D645,816 S | 9/2011 | Sasada et al. | |
| D664,498 S | 7/2012 | Liu | |
| D664,920 S | 8/2012 | Huang | |
| D670,244 S | 11/2012 | Workman et al. | |
| D686,155 S | 7/2013 | Nguyen | |
| D709,891 S | 7/2014 | Alesi et al. | |
| D717,305 S | 11/2014 | Alesi et al. | |
| D749,044 S | 2/2016 | Huang | |
| D756,908 S | 5/2016 | Chung | |
| D762,564 S | 8/2016 | Patton et al. | |
| D780,115 S | 2/2017 | Huang | |
| D815,037 S | 4/2018 | Chen | |
| D822,591 S | 7/2018 | Wu | |
| D826,846 S | 8/2018 | Greiner | |
| D844,557 S | 4/2019 | Wang | |
| D846,492 S | 4/2019 | Verleur et al. | |
| D860,951 S | 9/2019 | Hu | |
| D866,461 S | 11/2019 | Arimoto et al. | |
| D870,659 S | 12/2019 | Liao | |
| 2003/0203669 A1 | 10/2003 | Glauning | |
| 2005/0030741 A1 | 2/2005 | Uke | |
| 2006/0034073 A1 | 2/2006 | Uke | |
| 2008/0225519 A1 | 9/2008 | Uke | |
| 2008/0305387 A1 | 12/2008 | Murray et al. | |
| 2009/0148756 A1 | 6/2009 | Specht et al. | |
| 2010/0190052 A1 | 7/2010 | Rajani et al. | |
| 2011/0076523 A1 | 3/2011 | Iwamoto et al. | |
| 2012/0048587 A1 | 3/2012 | Umemura et al. | |
| 2013/0022847 A1 | 1/2013 | Janousek | |
| 2013/0344361 A1 | 12/2013 | Imre | |
| 2014/0106195 A1 | 4/2014 | Milbourne et al. | |
| 2014/0242449 A1 | 8/2014 | Lee et al. | |
| 2016/0241065 A1 | 8/2016 | Kondo et al. | |
| 2016/0260955 A1 | 9/2016 | Jo et al. | |
| 2018/0309096 A1 | 10/2018 | Kim et al. | |
| 2018/0315968 A1 | 11/2018 | Koyama et al. | |
| 2018/0347061 A1 | 12/2018 | Sadaki et al. | |
| 2019/0207273 A1 | 7/2019 | Chen et al. | |
| 2019/0252732 A1 | 8/2019 | Park et al. | |
| 2019/0348703 A1 | 11/2019 | Lim et al. | |

FOREIGN PATENT DOCUMENTS

| | | |
|---|---|---|
| EP | 1061593 A2 | 12/2000 |
| EP | 3059781 A1 | 8/2016 |
| JP | 3083442 | 9/2000 |
| JP | 2009163292 A | 7/2009 |
| JP | 1442636 | 6/2012 |
| TW | D147001 | 5/2012 |

OTHER PUBLICATIONS

International Search Report and Written Opinion for Application No. PCT/CN2016/102208 dated Jul. 24, 2017 (6 pages).
International Search Report and Written Opinion for Application No. PCT/CN2016/102208 dated Jul. 24, 2017, 12 pages.
European Patent Office Extended Search Report for Application No. 16918594.9 dated May 4, 2020 (7 pages).
Chinese Patent Office Action for Application No. 201680091642.4 dated Oct. 15, 2021 (15 pages including statement of relevance).

* cited by examiner

BATTERY PACK

FIELD

The present invention relates to battery packs and, more particularly, to electromechanical coupling features for a battery pack.

SUMMARY

Rechargeable battery packs commonly include at least one battery cell supported in a housing configured to engage an electronic device to facilitate electromechanical coupling therebetween. Conventional battery packs are generally configured as either "slide on" battery packs attachable to a device along an insertion axis extending transversely relative to a tool axis or "insertable" battery packs attachable to a device along an insertion axis parallel to/collinear with a tool axis.

In one independent aspect, a battery pack may generally include a housing extending along an axis; a battery cell positioned in the housing; a first insertion alignment member disposed on the housing guiding insertion of the battery pack into a first electronic device in a first direction relative to the axis; and a second insertion alignment member guiding insertion of the battery pack into a second electronic device in a different, second direction relative to the axis.

In another independent aspect, a battery pack may generally include a housing extending along an axis; a battery cell positioned in the housing; battery pack terminals electrically coupled to the battery cell and operable to interface with and to electrically couple the battery cell to device terminals of each of a first electronic device and a second electronic device; a first insertion alignment member disposed on the housing guiding insertion of the battery pack into a first electronic device in a first direction relative to the axis, the first insertion alignment member cooperating with a complementary alignment member on the first electronic device to guide insertion of the battery pack into the first electronic device, the first insertion alignment member cooperating with a complementary lockout member on the second electronic device to facilitate engagement of the battery terminals with the device terminals of the second electronic device; and a second insertion alignment member guiding insertion of the battery pack into a second electronic device in a different, second direction relative to the axis, the second insertion alignment member cooperating with a complementary second alignment member on the second electronic device to guide insertion of the battery pack into the second electronic device, the second insertion alignment member cooperating with a complementary lockout member on the first electronic device to facilitate engagement of the battery terminals with the device terminals of the first electronic device.

In yet another independent aspect, a method may be provided for selectively coupling a battery pack to a first electronic device and to a second electronic device, the battery pack including a housing extending along an axis, a battery cell positioned in the housing, a first insertion alignment member, and a second insertion alignment member. The method may generally include coupling the battery pack to the first electronic device by aligning the first insertion alignment member with an alignment member on a receiving portion of the first electronic device; and inserting the battery pack into the first electronic device in a first direction relative to the axis; and coupling the battery pack to the second electronic device by aligning the second insertion alignment member with an alignment member on a receiving portion of the second electronic device; and inserting the battery pack into the second electronic device in a different, second direction relative to the axis.

Other independent features and independent aspects of the invention may become apparent by consideration of the following detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

In addition, it should be understood that embodiments of the invention may include hardware, software, and electronic components or modules that, for purposes of discussion, may be illustrated and described as if the majority of the components were implemented solely in hardware. However, based on a reading of the detailed description, it should be recognized that, in at least one embodiment, electronic-based aspects of the invention may be implemented in software (e.g., instructions stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Figure 22:
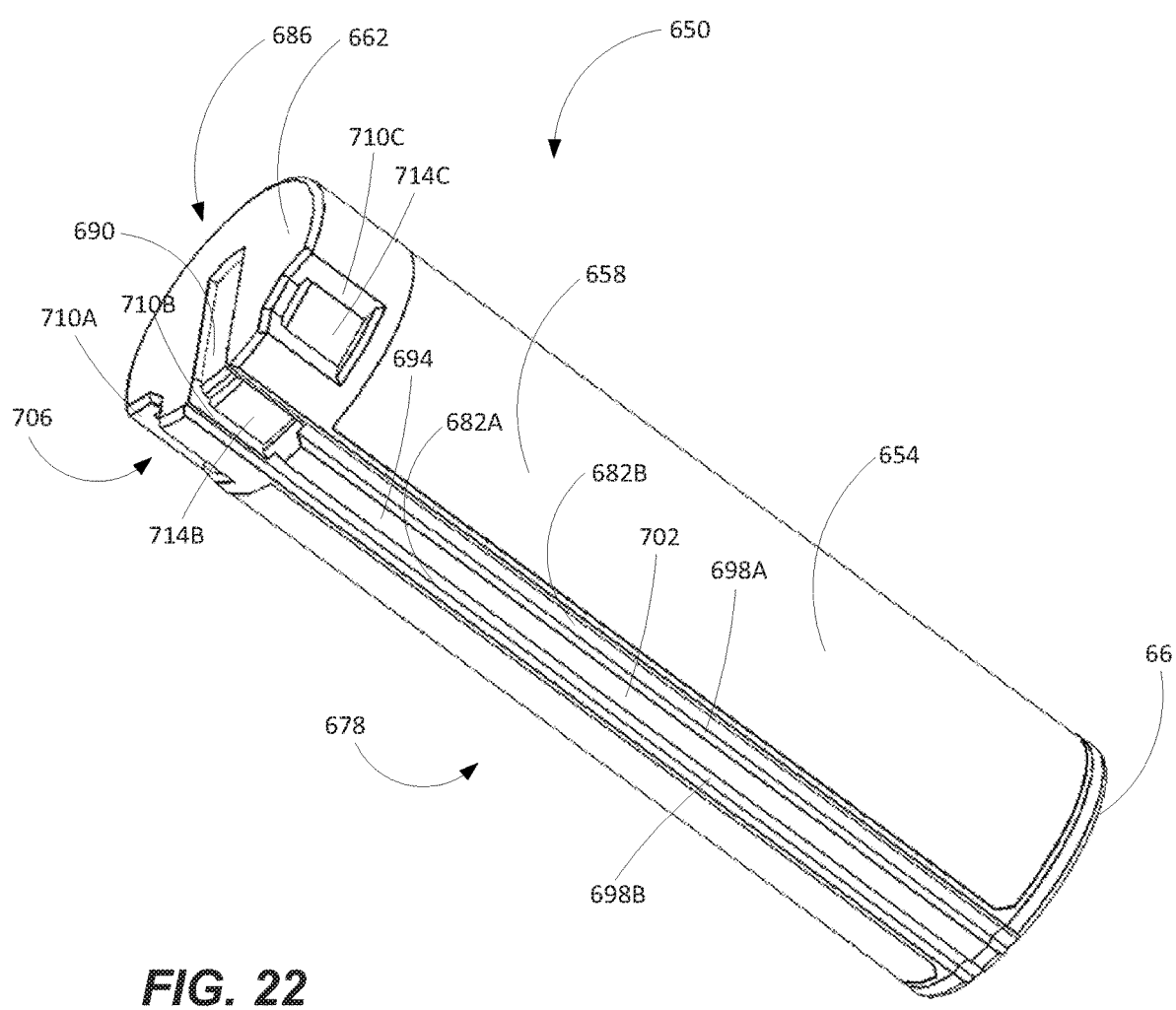
FIG. 22 is a perspective view of yet another alternative construction of a battery pack.
Figure 23:
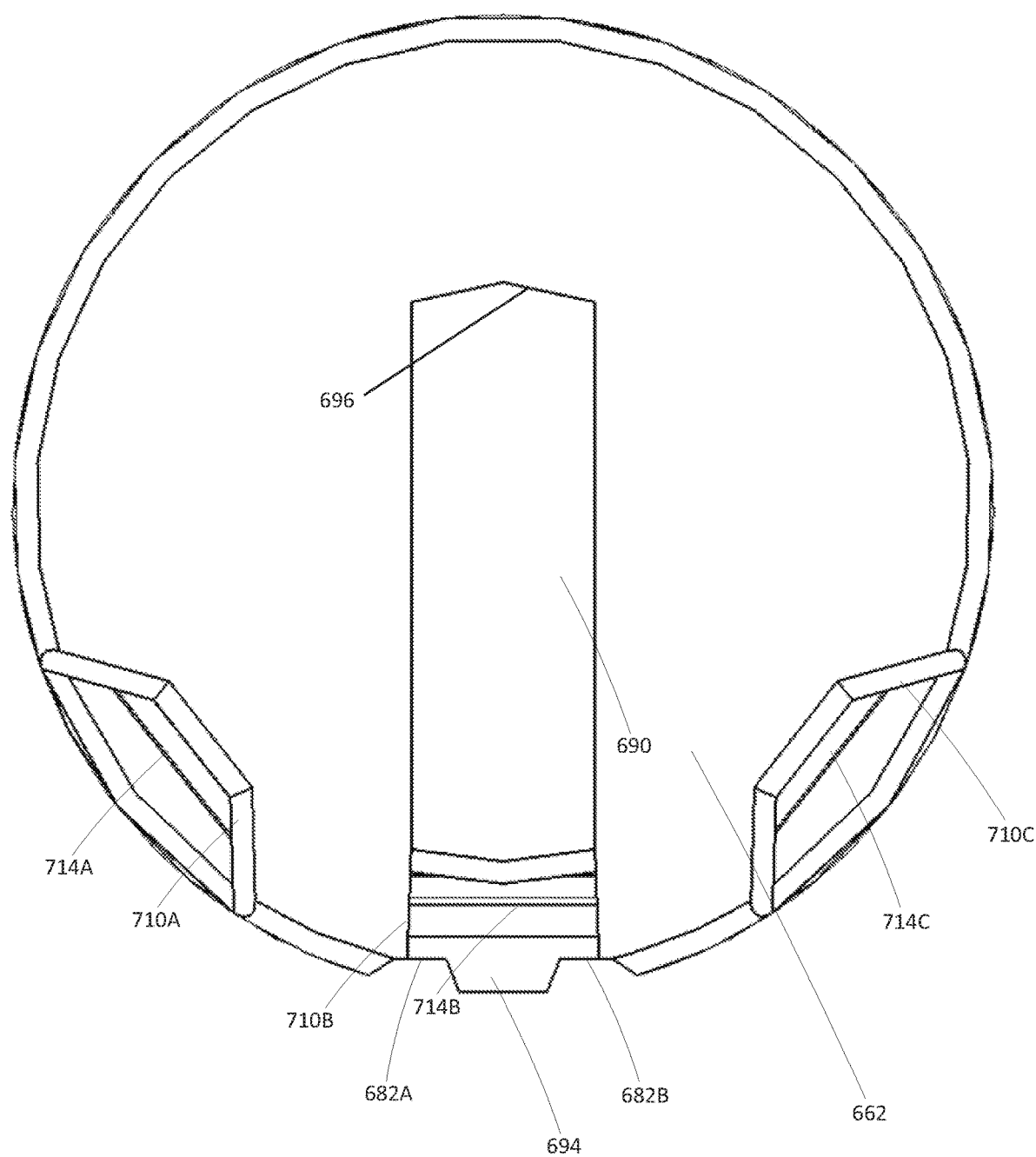
FIG. 23 is a top view of the battery pack of FIG. 22.
Figure 24:
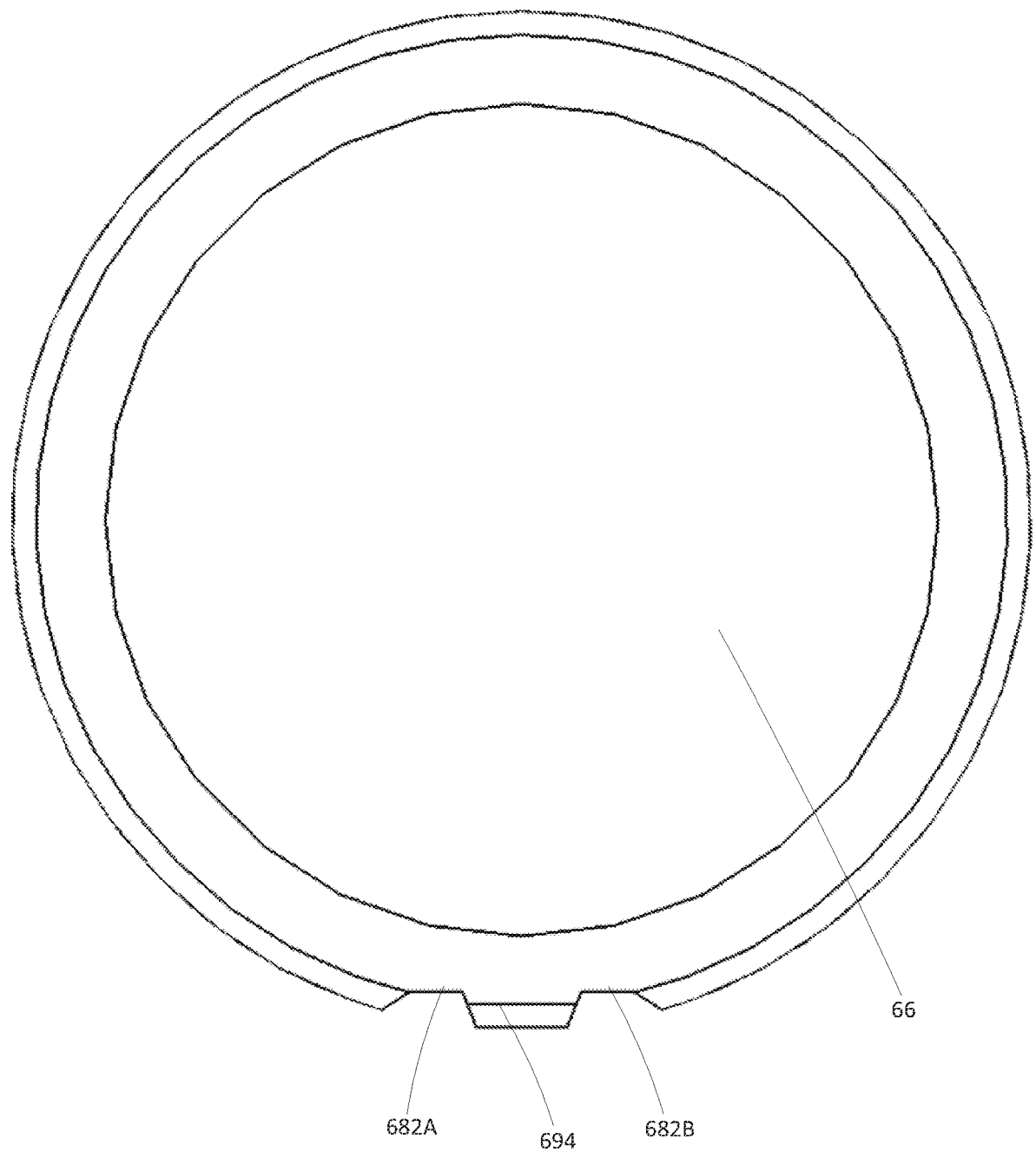
FIG. 24 is a bottom view of the battery pack of FIG. 22.
Figure 25:
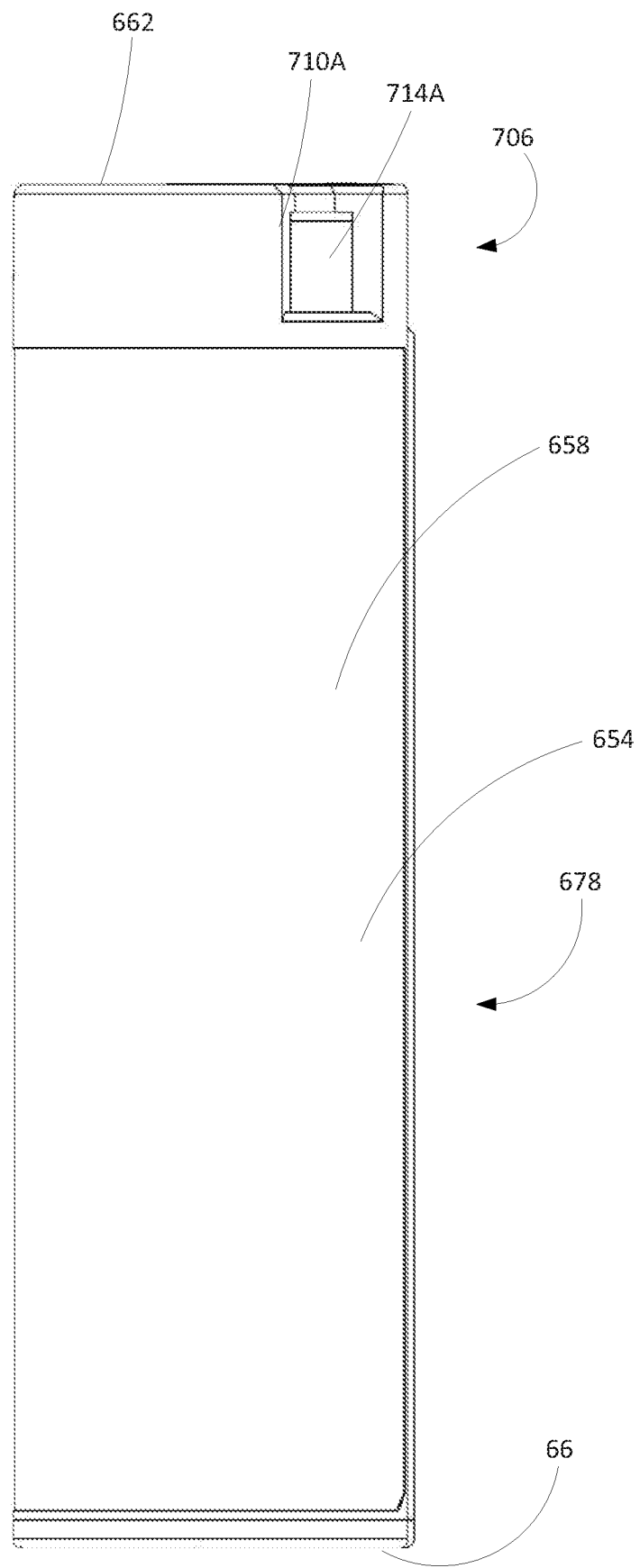
FIG. 25 is a first side view of the battery pack of FIG. 22.
Figure 26:
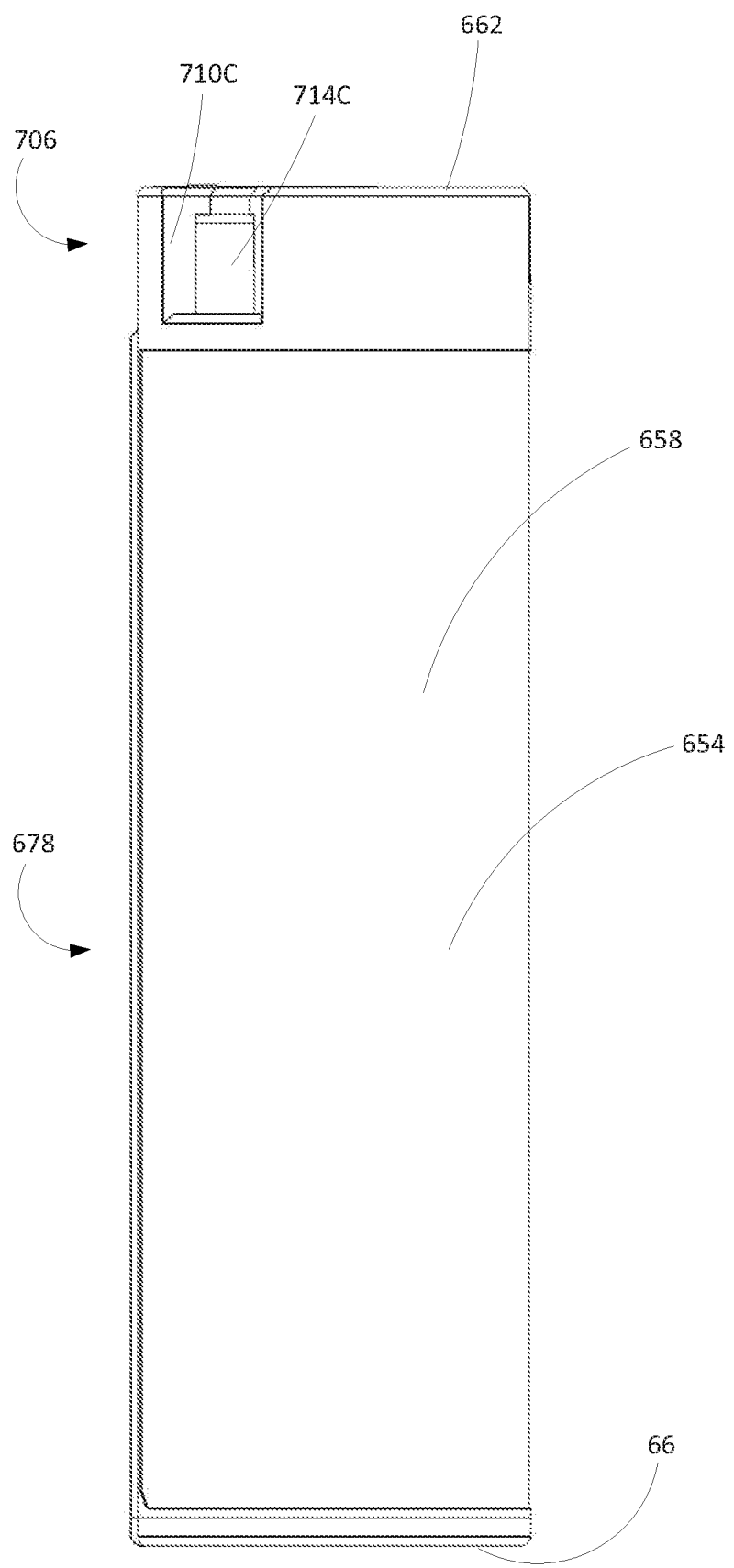
FIG. 26 is a second side view of the battery pack of FIG. 22.
Figure 27:
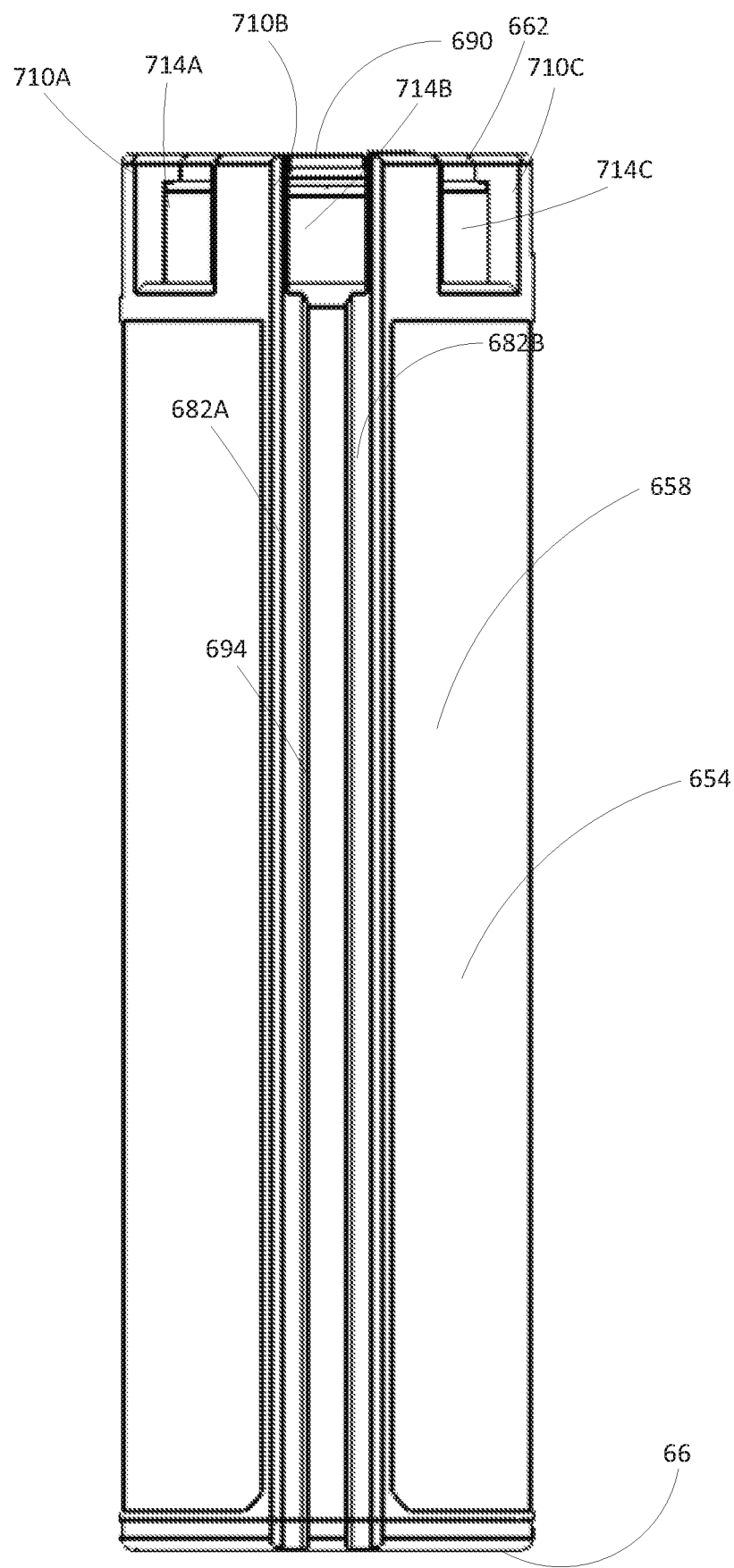
FIG. 27 is a third side view of the battery pack of FIG. 22.
Figure 28:
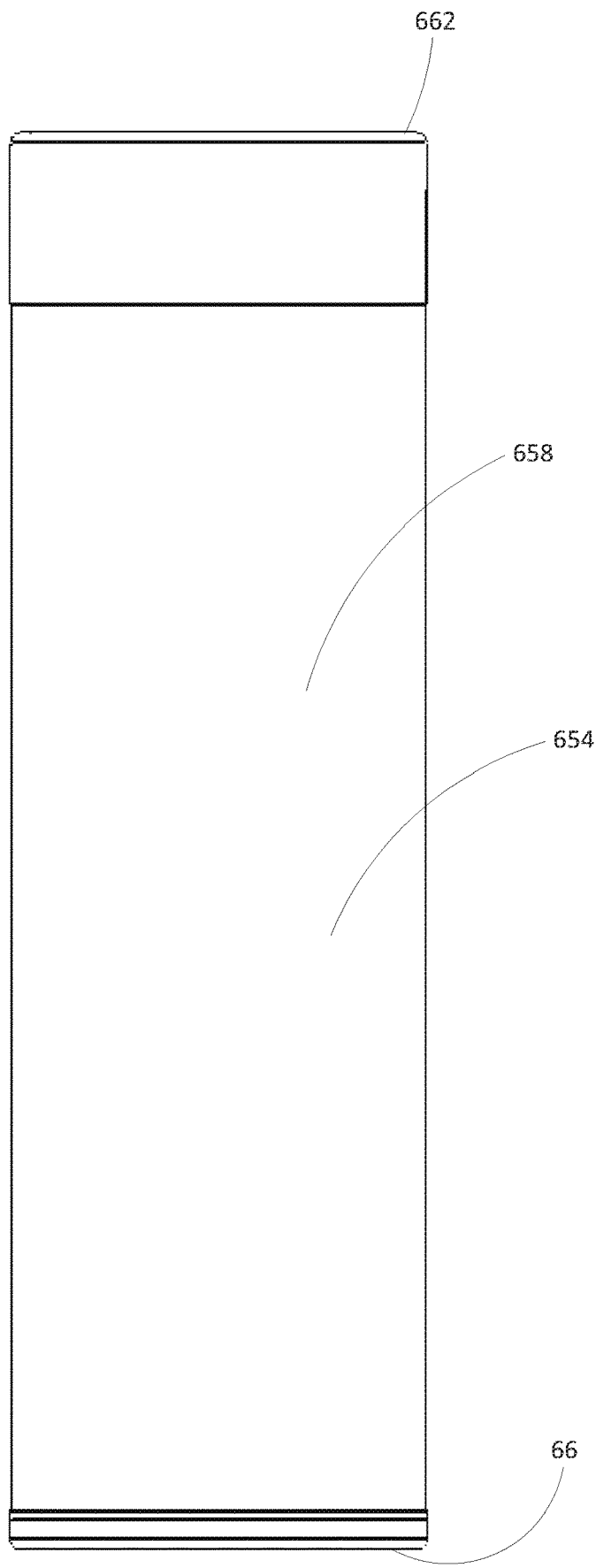
FIG. 28 is a fourth side view of the battery pack of FIG. 22.

FIGS. 1-7 illustrate a battery pack 50 configured to be removably received by and power an electronic device (see FIG. 22; e.g., a headlamp 800, a flashlight 804, a flood light 808, a drill, a driver, etc.). As will be described in greater detail below, the battery pack 50 is configured to facilitate radial insertion into a receiving port or portion of one electronic device as well as axial insertion into a receiving port of another electronic device.

The illustrated battery pack 50 includes (see FIGS. 1-7) a generally cylindrical housing 54 defined by an arcuate sidewall 58 extending between a first end surface 62 and a second end surface 66 and defining an interior cavity 70 configured to support at least one battery cell 74 (e.g., a lithium-ion battery cell). The housing 54 includes an axial insertion alignment member 78 provided by one or more projections or grooves (e.g., a pair of grooves 82A, 82B, as illustrated) extending along an axial direction of the sidewall 58 from the first end surface 62 toward the second end surface 66, and a radial insertion alignment member 86 provided by one or more projections or grooves (e.g., one groove 90) extending radially across the first end surface 62.

The pair of grooves 82A, 82B is separated by a shoulder 94 extending therebetween. The illustrated shoulder 94 is defined by two obliquely extending lateral walls 98A, 98B and an arcuate outer surface 102 having a radius generally equivalent to that of the sidewall 58. Each of the lateral walls 98A, 98B forms a portion of one of the first groove 82A and the second groove 82B. In the illustrated embodiment, the grooves 82A, 82B have substantially the same width (e.g., approximately 2 mm) and are generally symmetrical about the shoulder 294. In other embodiments (not shown), the number and dimensions of the grooves 82A, 82B, 90 and the shoulder 94, if provided, may be different.

Figure 1:
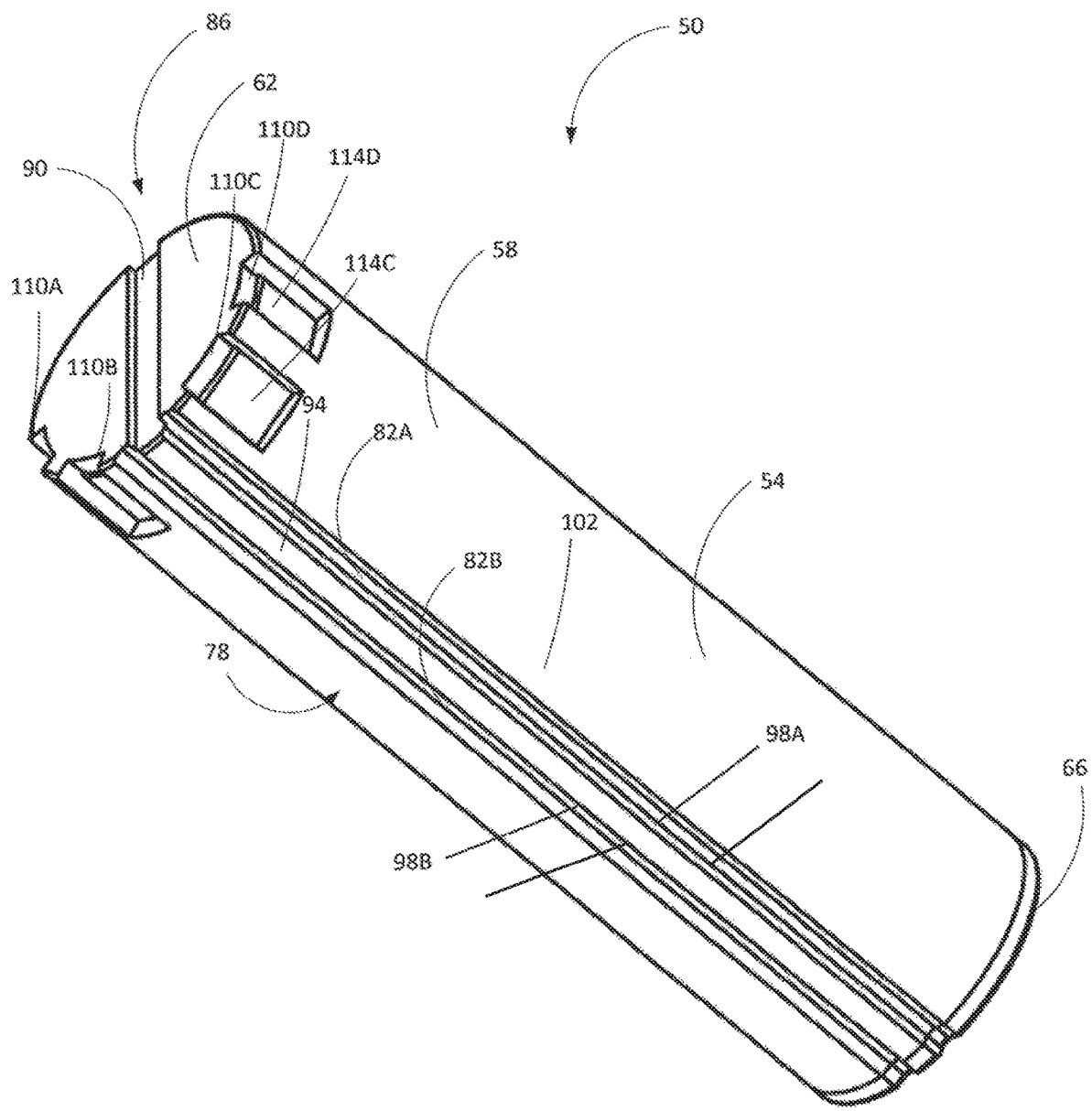
FIG. 1 is a perspective view of a battery pack.
Figure 2:
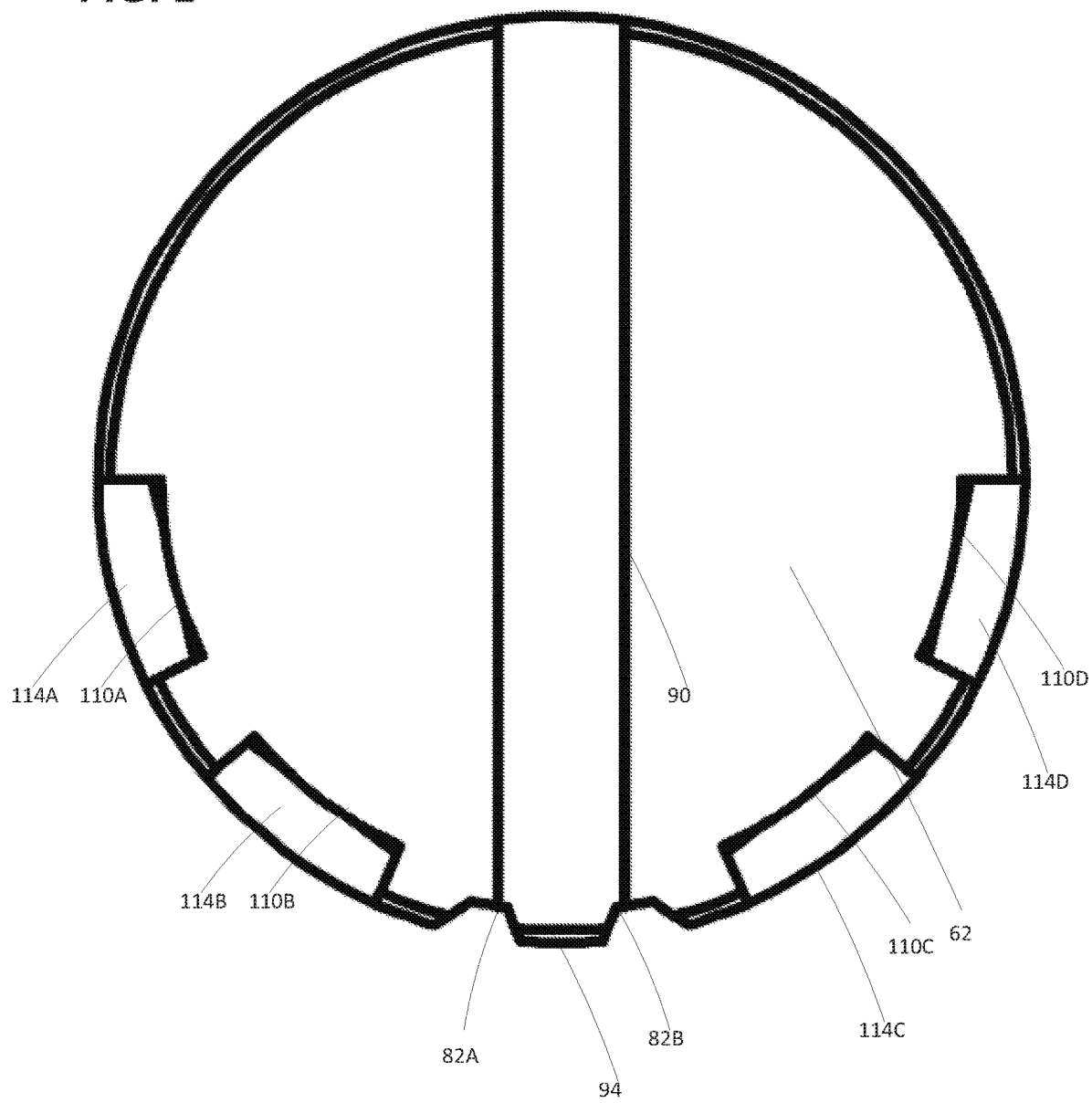
FIG. 2 is a top view of the battery pack of FIG. 1.
Figure 3:
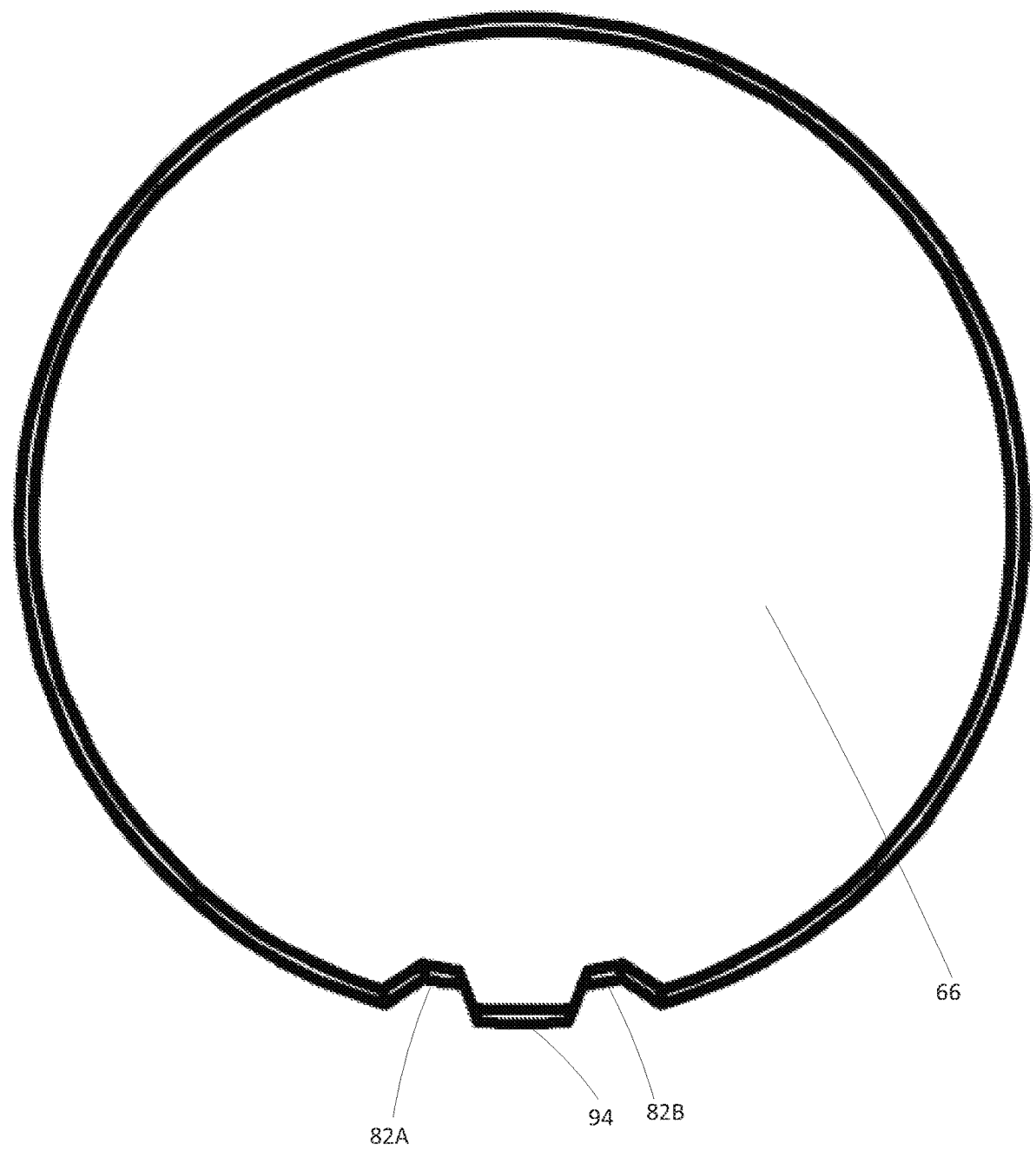
FIG. 3 is a bottom view of the battery pack of FIG. 1.
Figure 4:
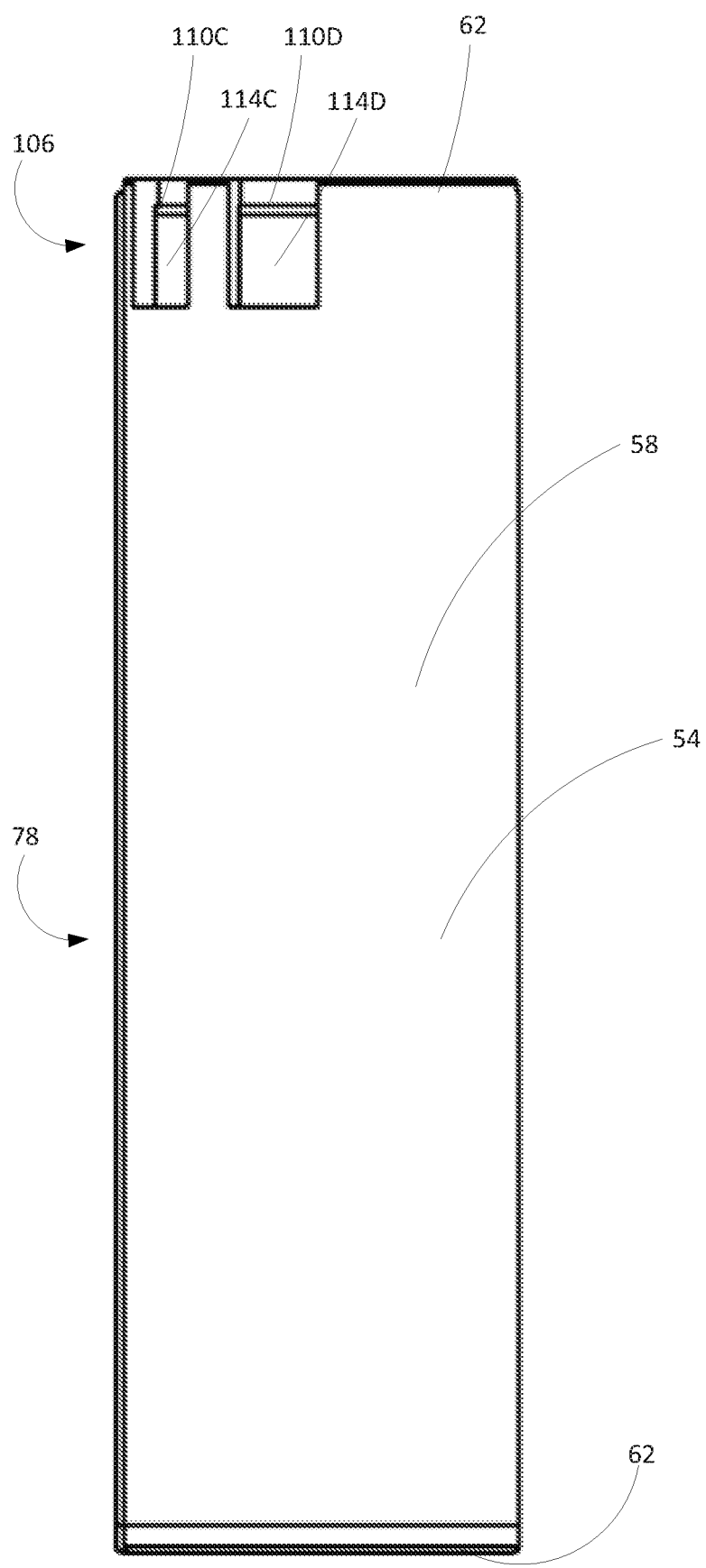
FIG. 4 is a first side view of the battery pack of FIG. 1.
Figure 5:
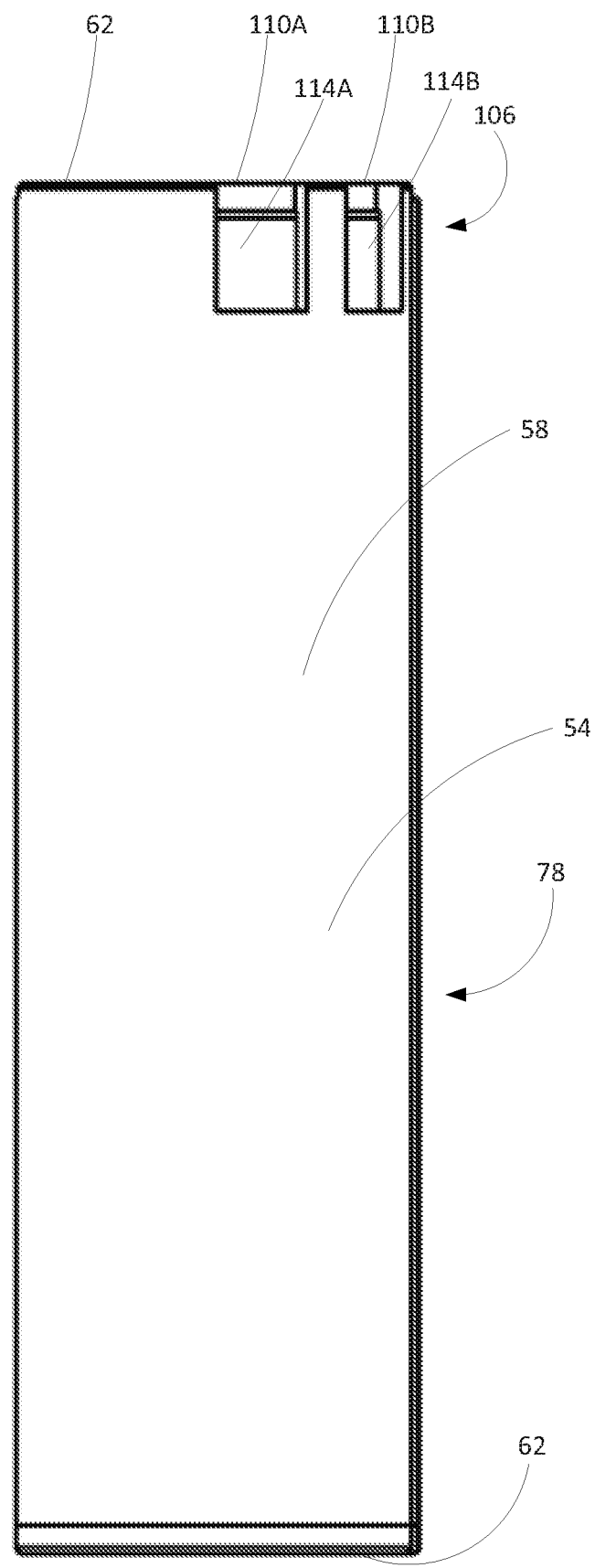
FIG. 5 is a second side view of the battery pack of FIG. 1.
Figure 6:
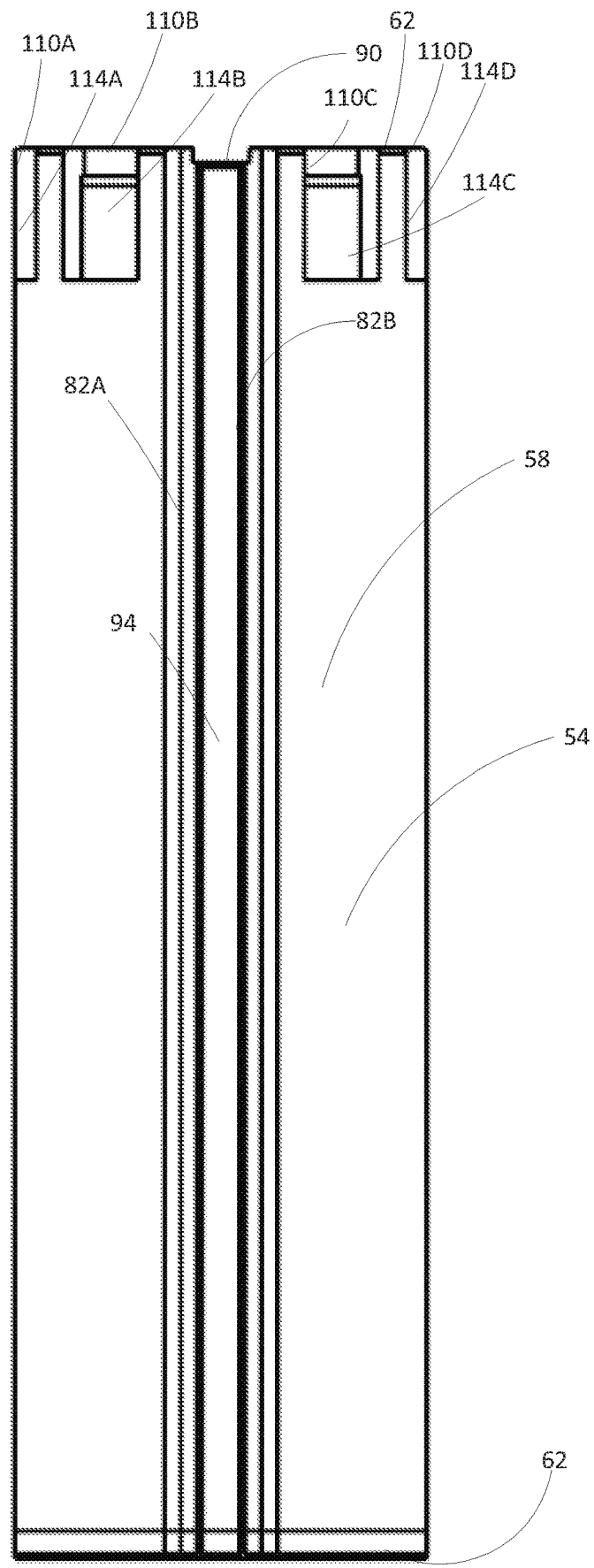
FIG. 6 is a third side view of the battery pack of FIG. 1.
Figure 7:
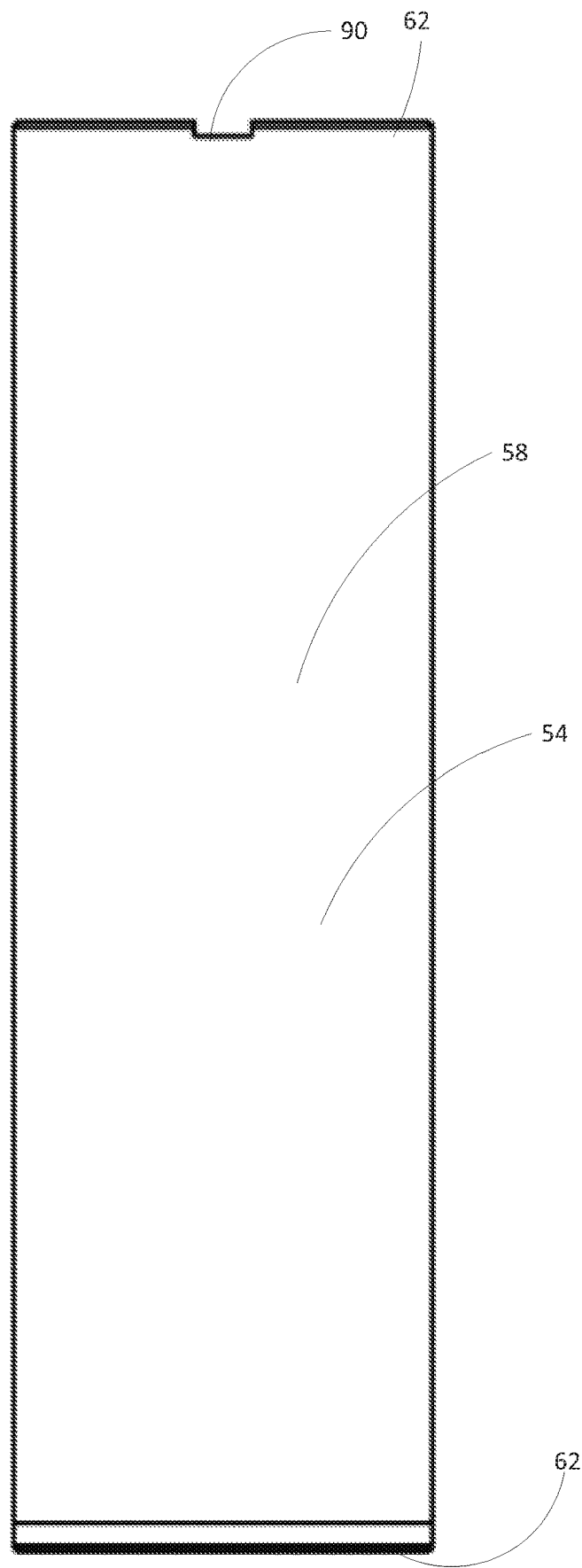
FIG. 7 is a fourth side view of the battery pack of FIG. 1.
Figure 8:
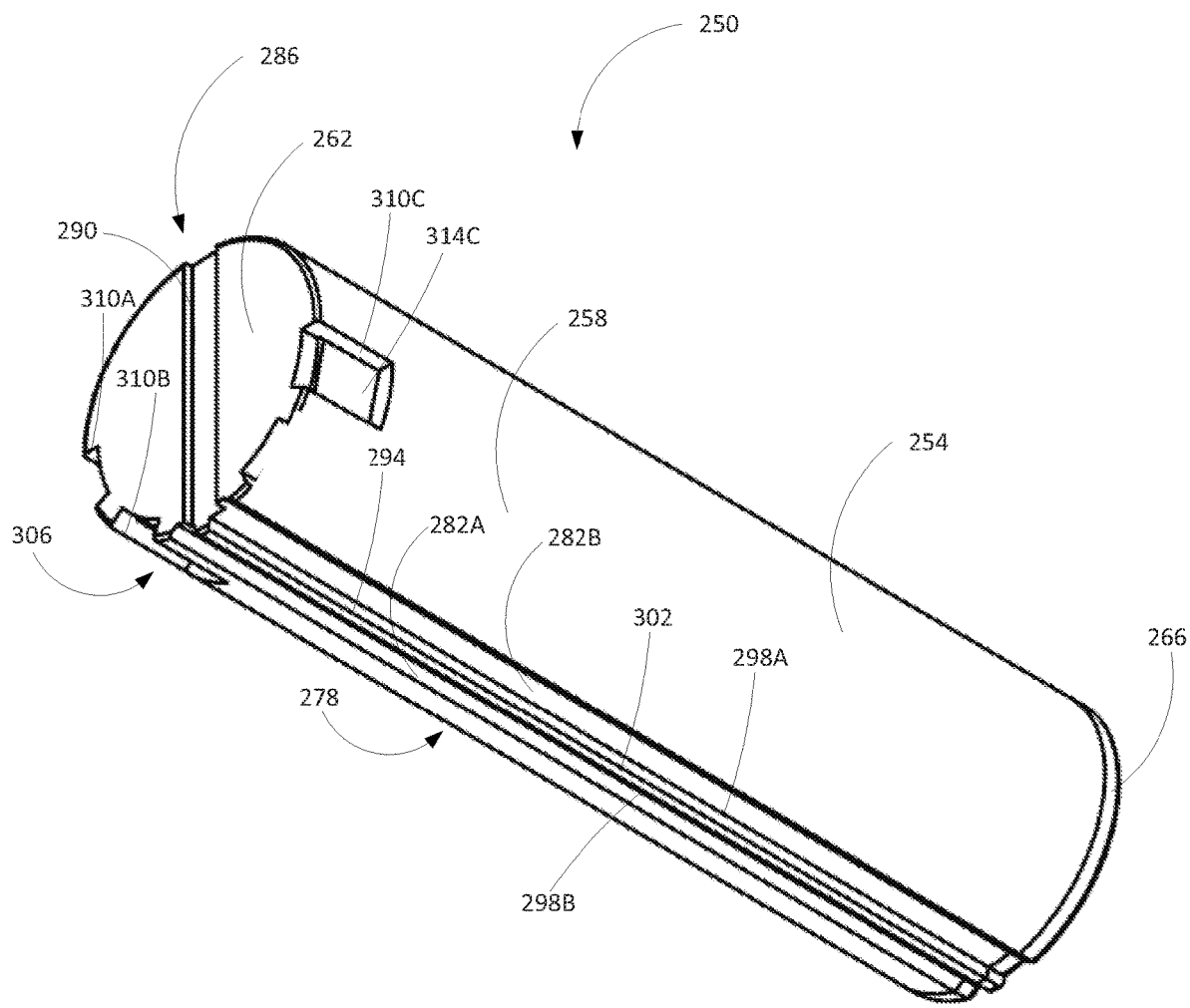
FIG. 8 is a perspective view of an alternative construction of a battery pack.
Figure 9:
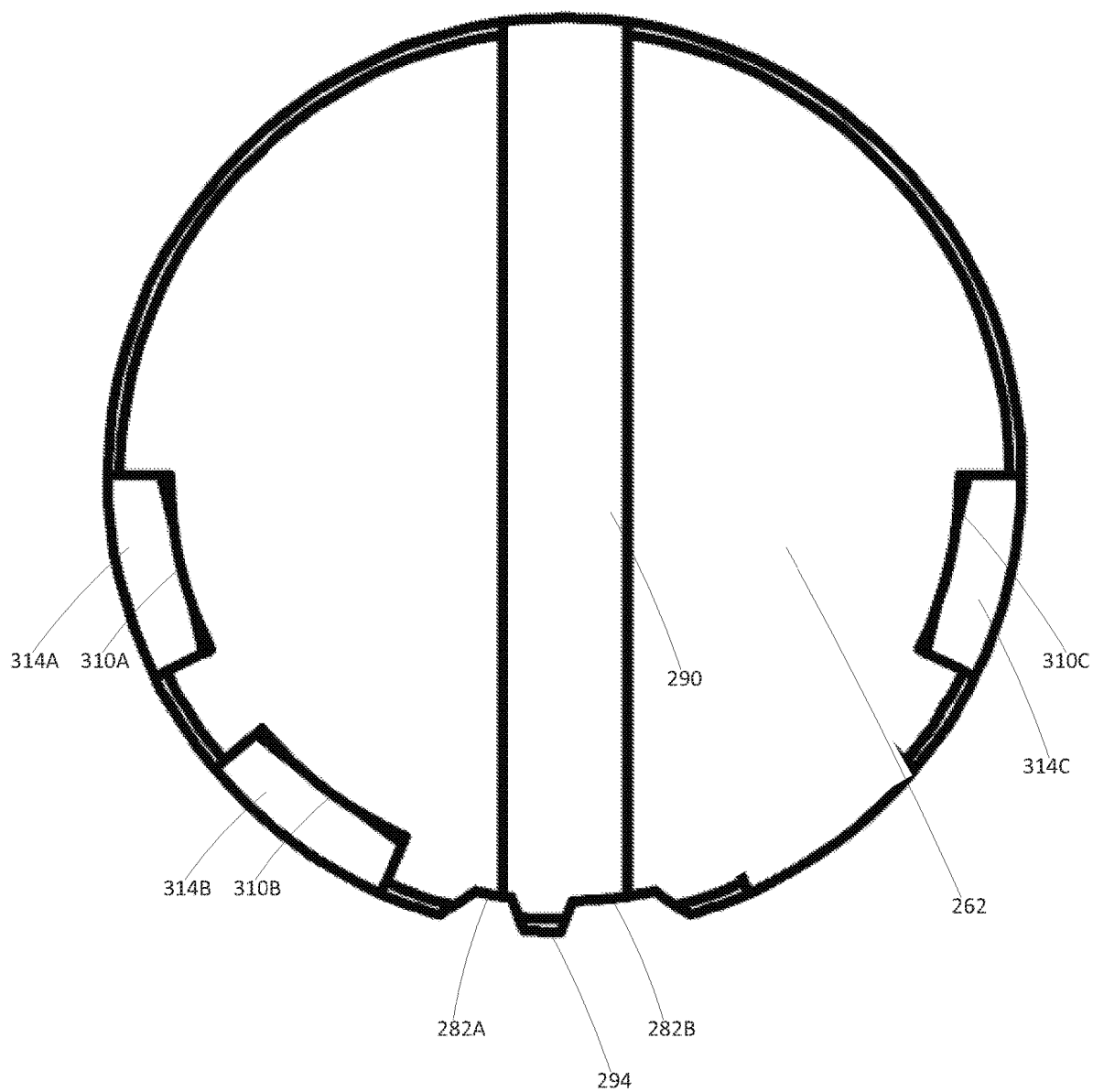
FIG. 9 is a top view of the battery pack of FIG. 8.
Figure 10:
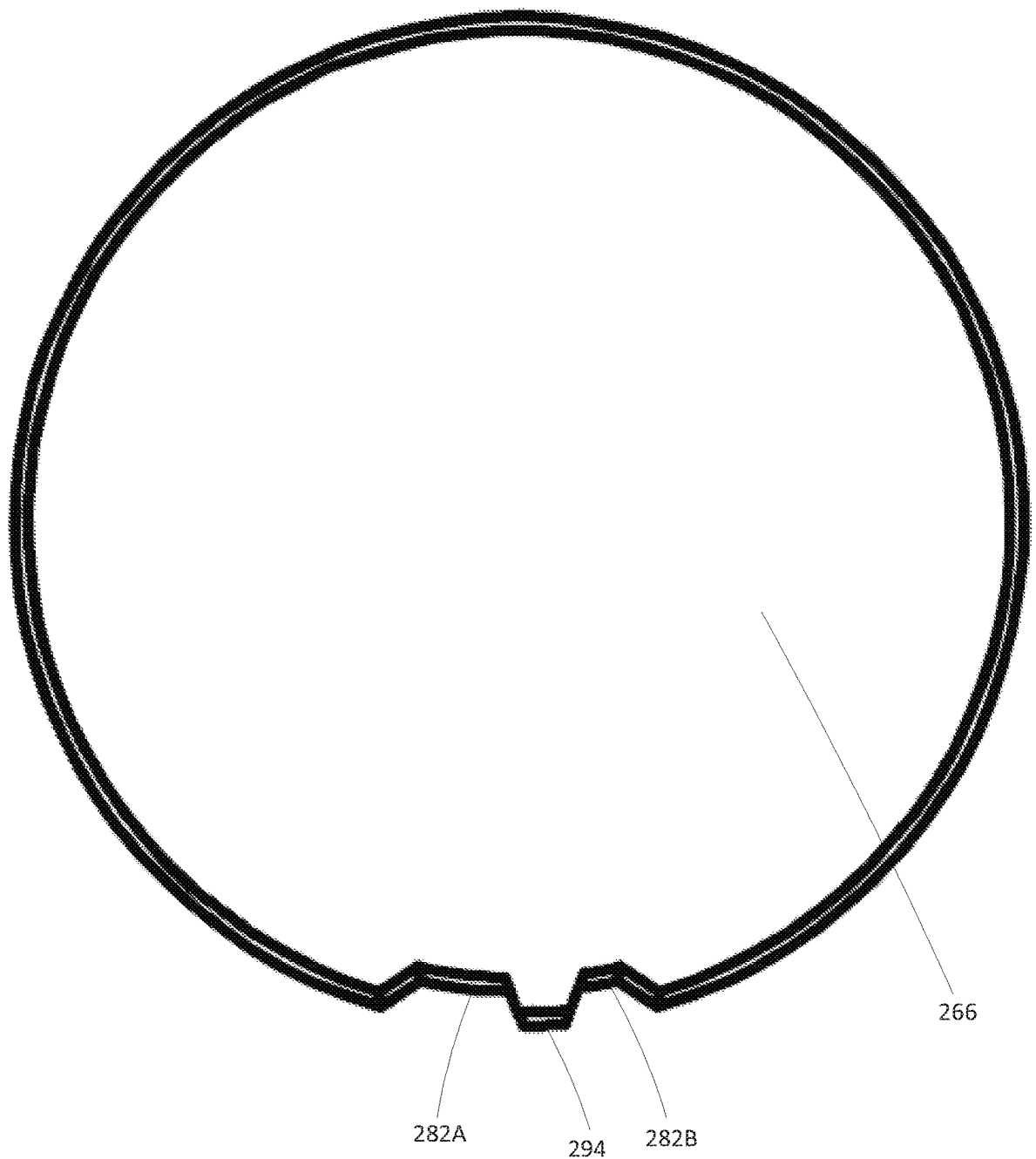
FIG. 10 is a bottom view of the battery pack of FIG. 8.
Figure 11:
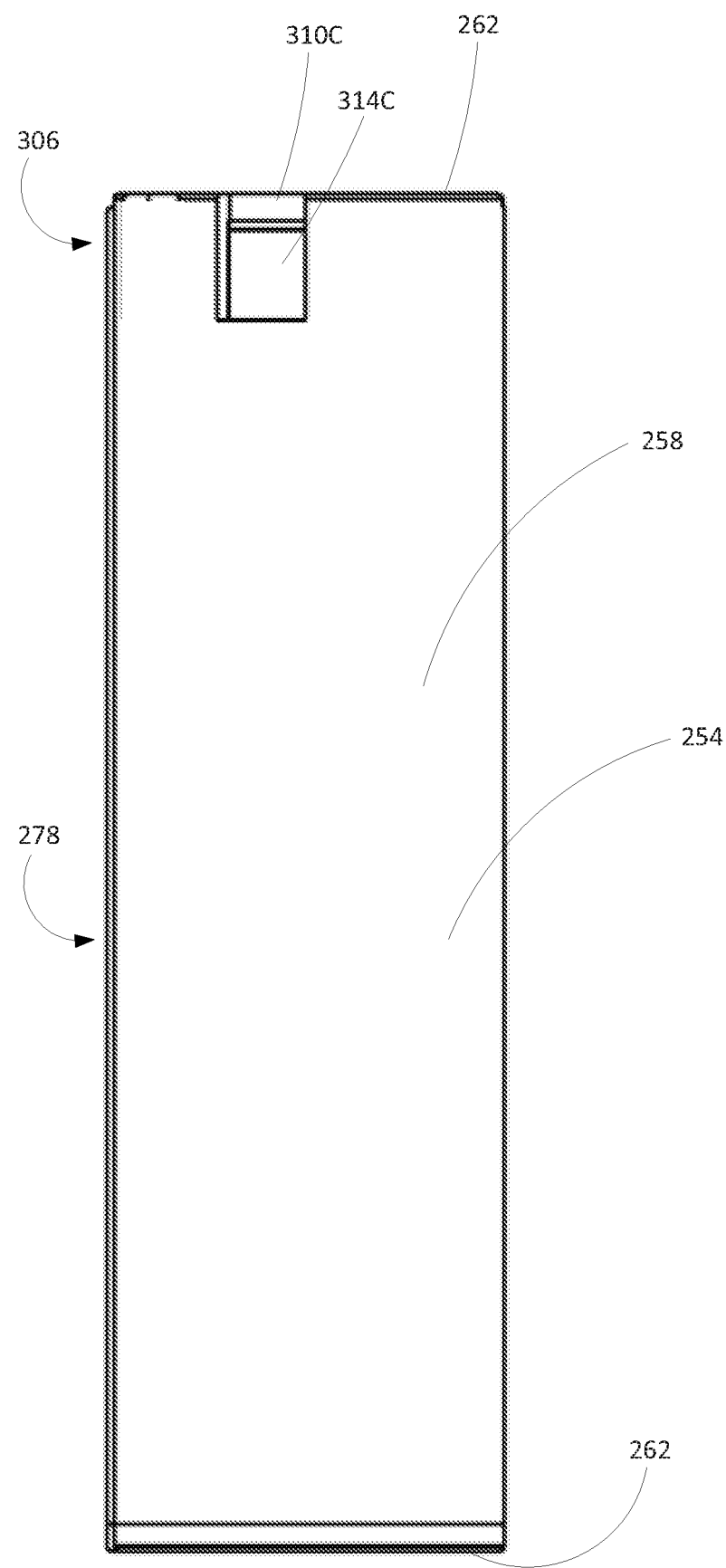
FIG. 11 is a first side view of the battery pack of FIG. 8.
Figure 12:
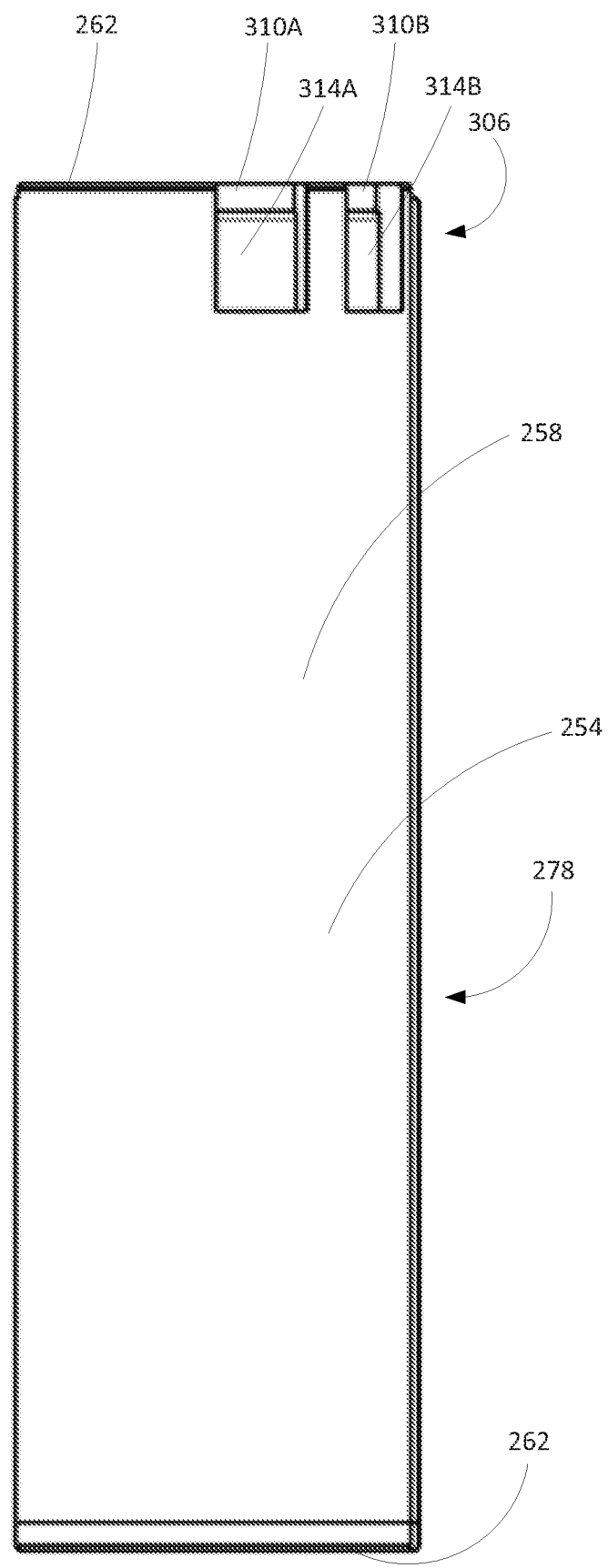
FIG. 12 is a second side view of the battery pack of FIG. 8.
Figure 13:
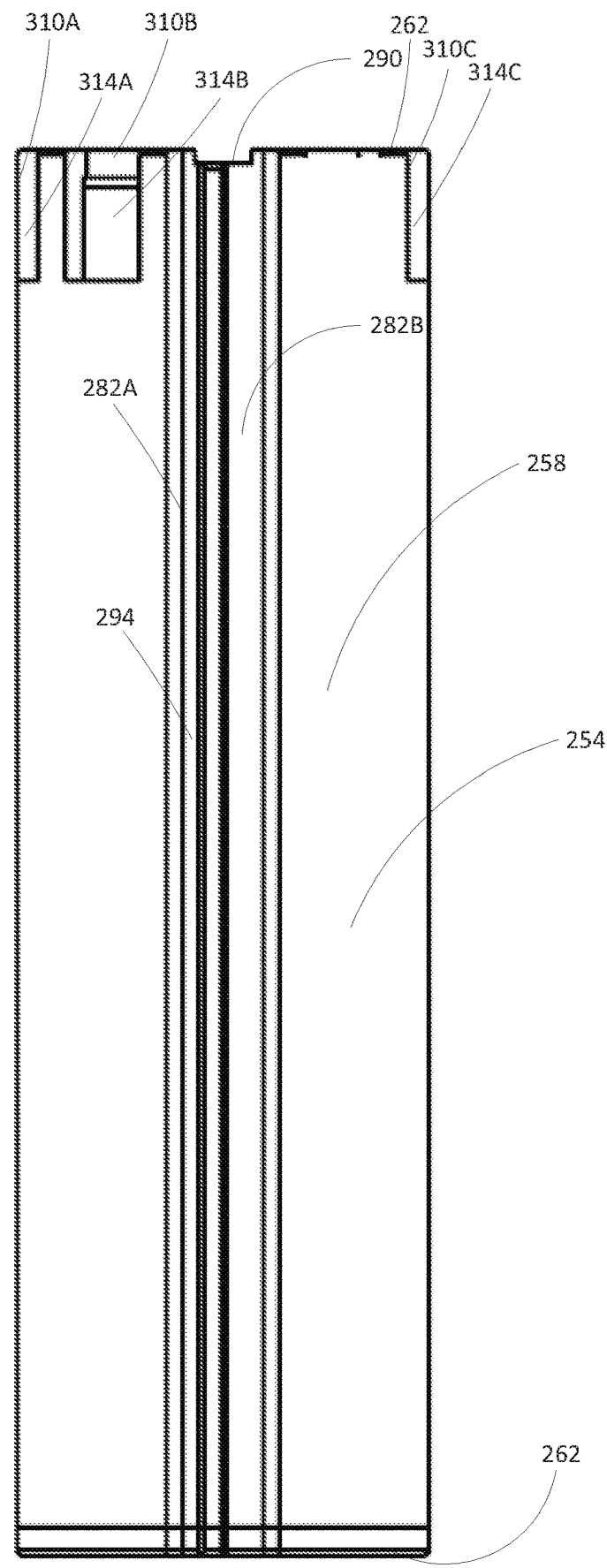
FIG. 13 is a third side view of the battery pack of FIG. 8.
Figure 14:
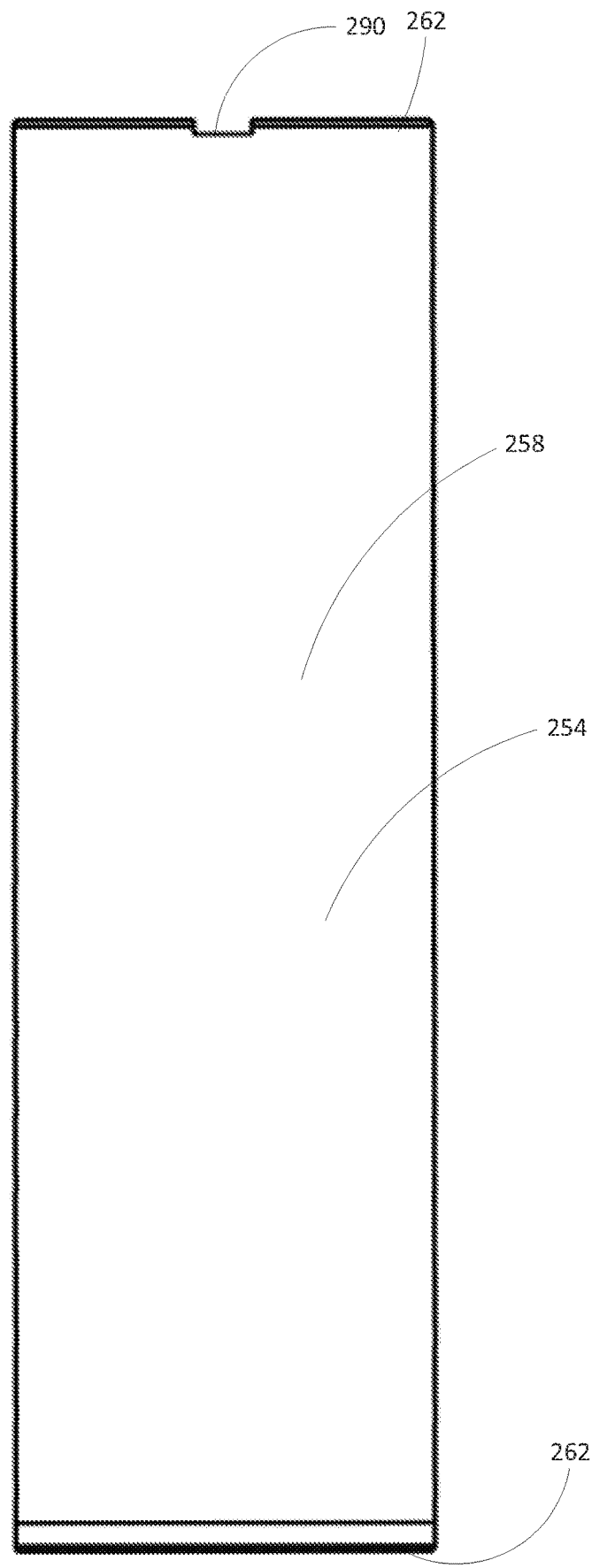
FIG. 14 is a fourth side view of the battery pack of FIG. 8.
Figure 15:
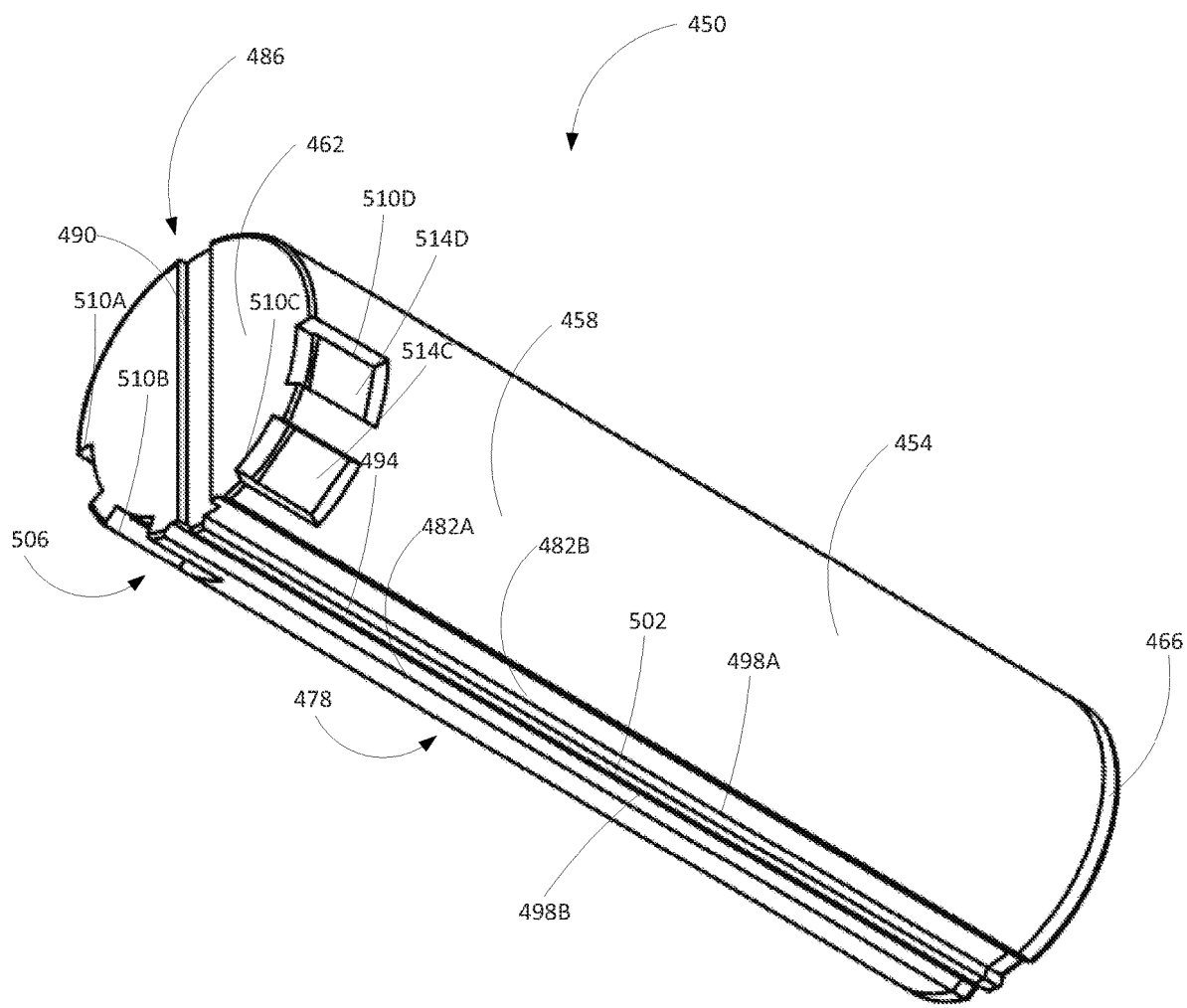
FIG. 15 is a perspective view of another alternative construction of a battery pack.
Figure 16:
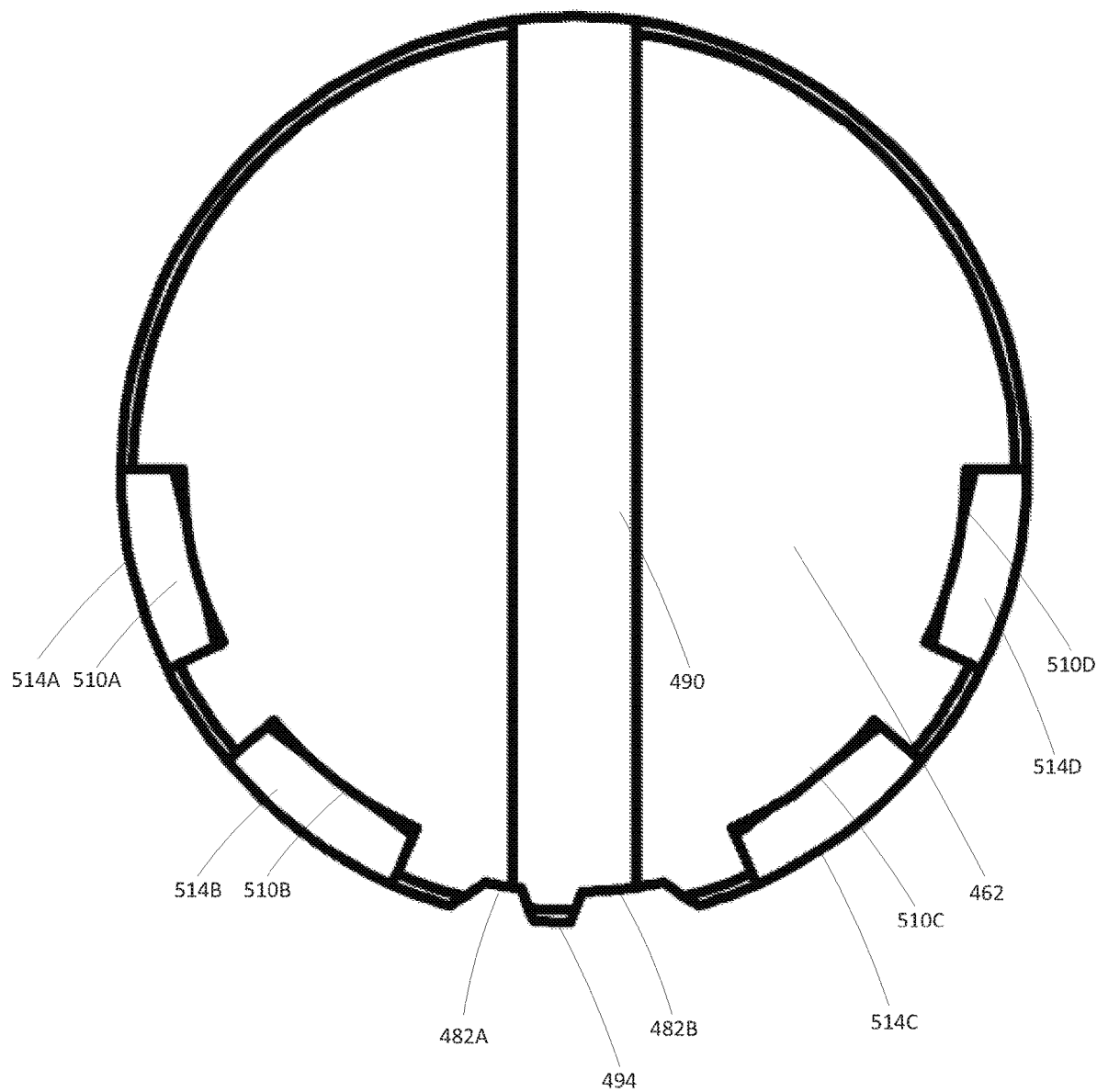
FIG. 16 is a top view of the battery pack of FIG. 15.
Figure 17:
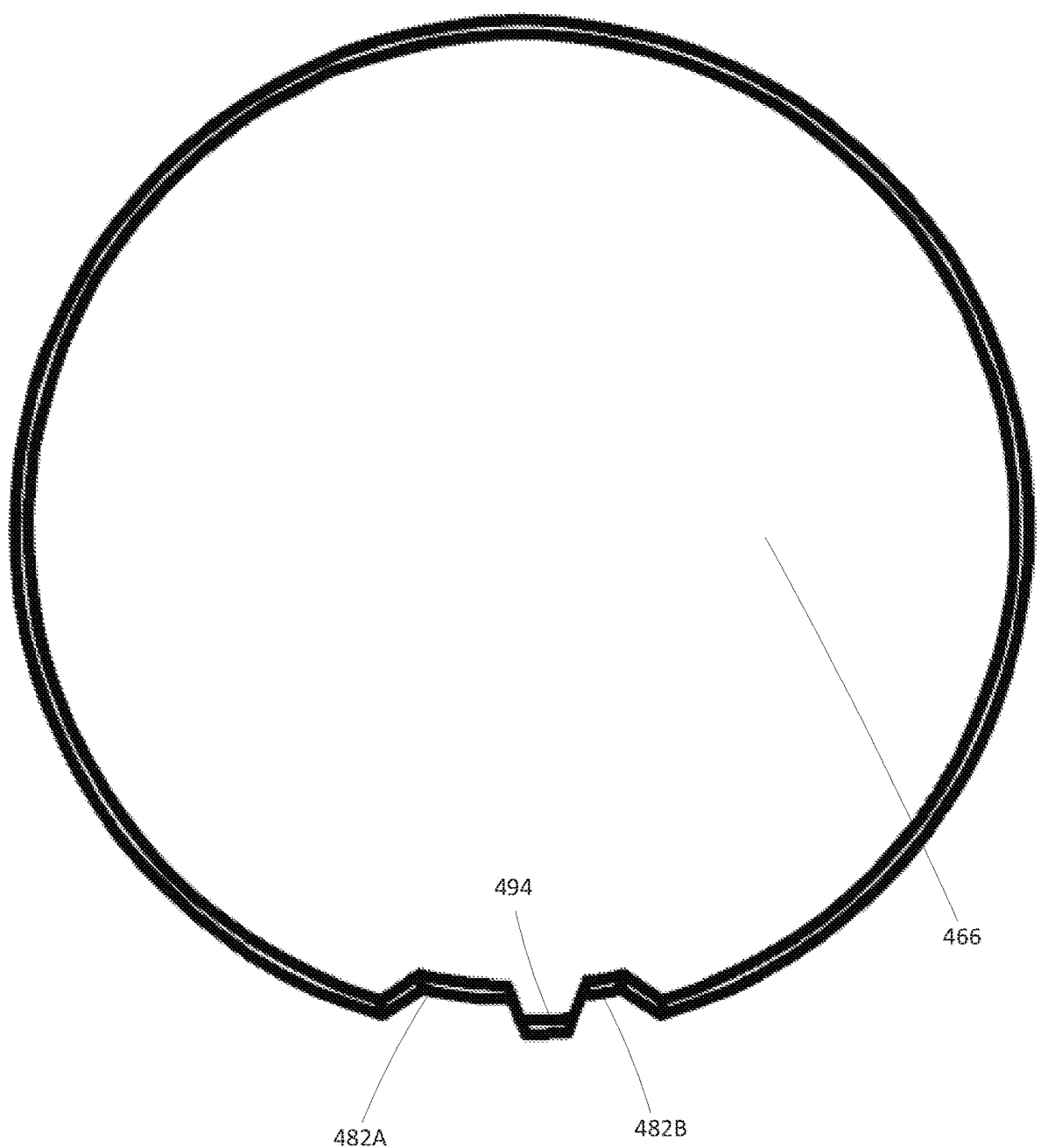
FIG. 17 is a bottom view of the battery pack of FIG. 15.
Figure 18:
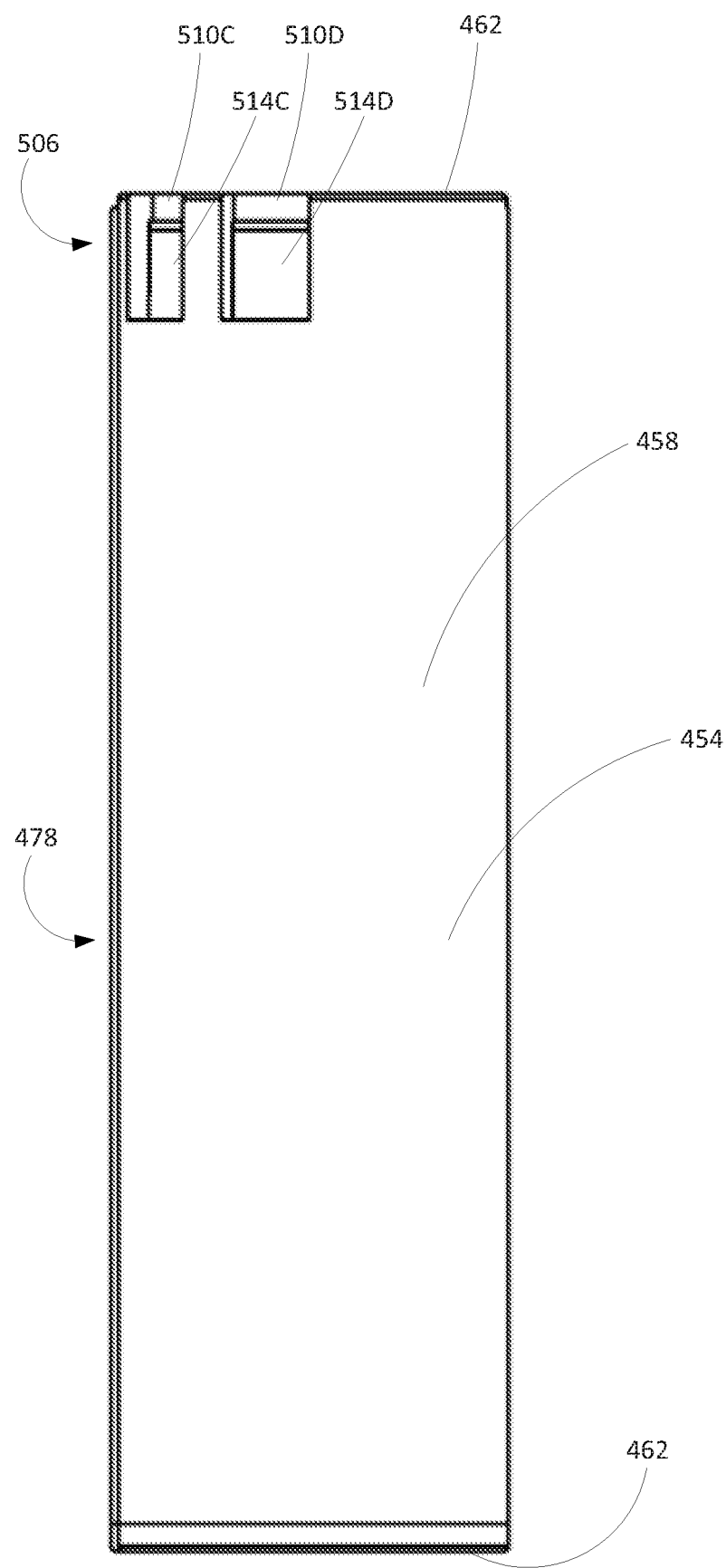
FIG. 18 is a first side view of the battery pack of FIG. 15.
Figure 19:
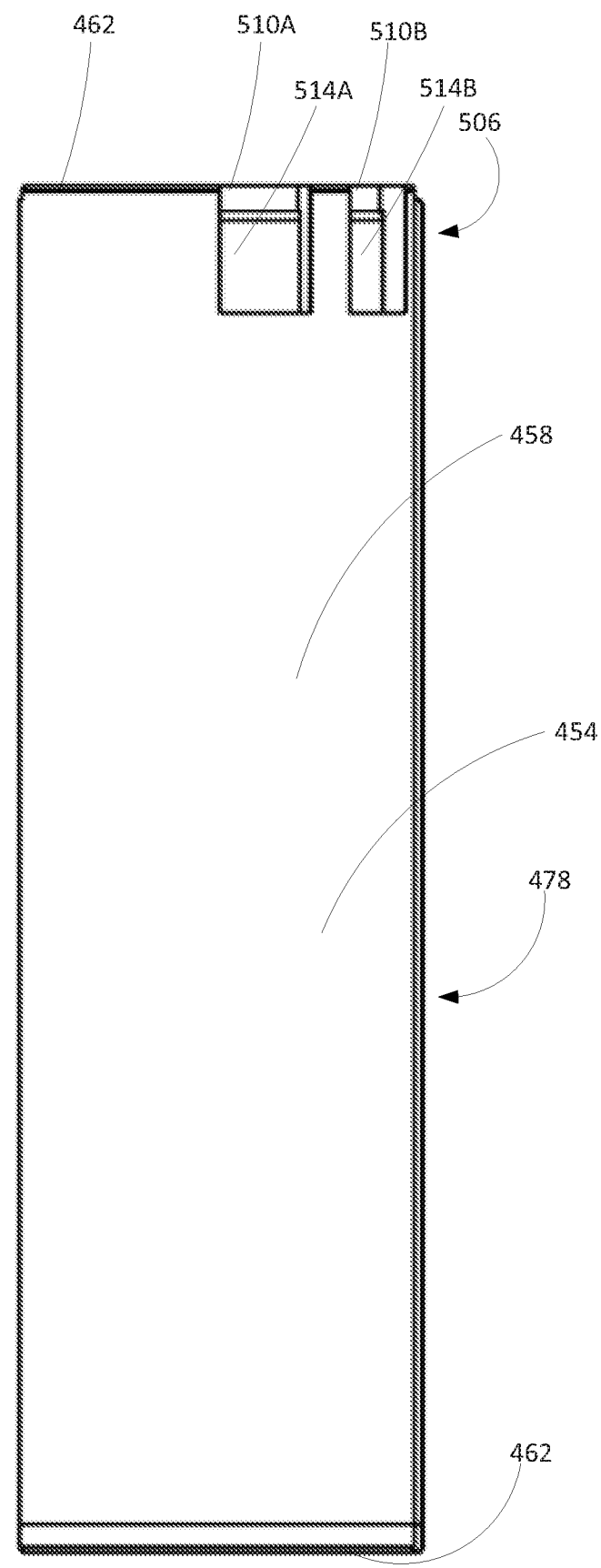
FIG. 19 is a second side view of the battery pack of FIG. 15.
Figure 20:
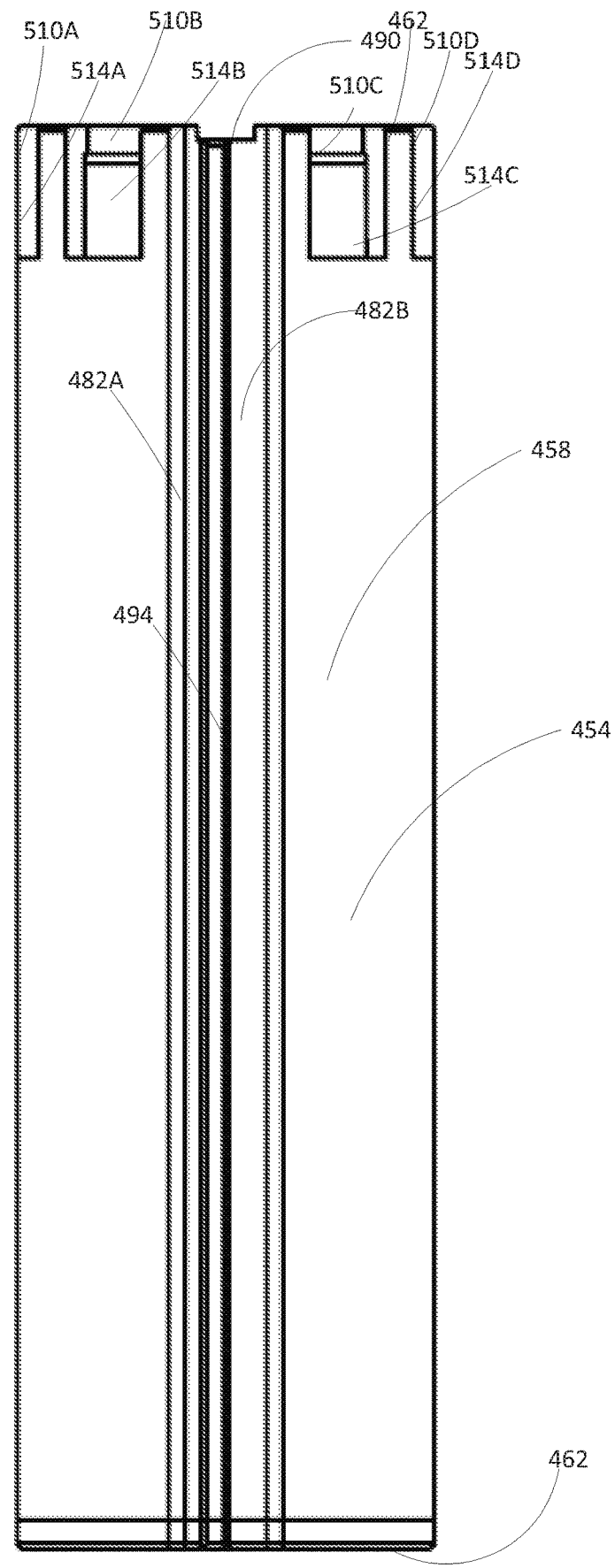
FIG. 20 is a third side view of the battery pack of FIG. 15.
Figure 21:
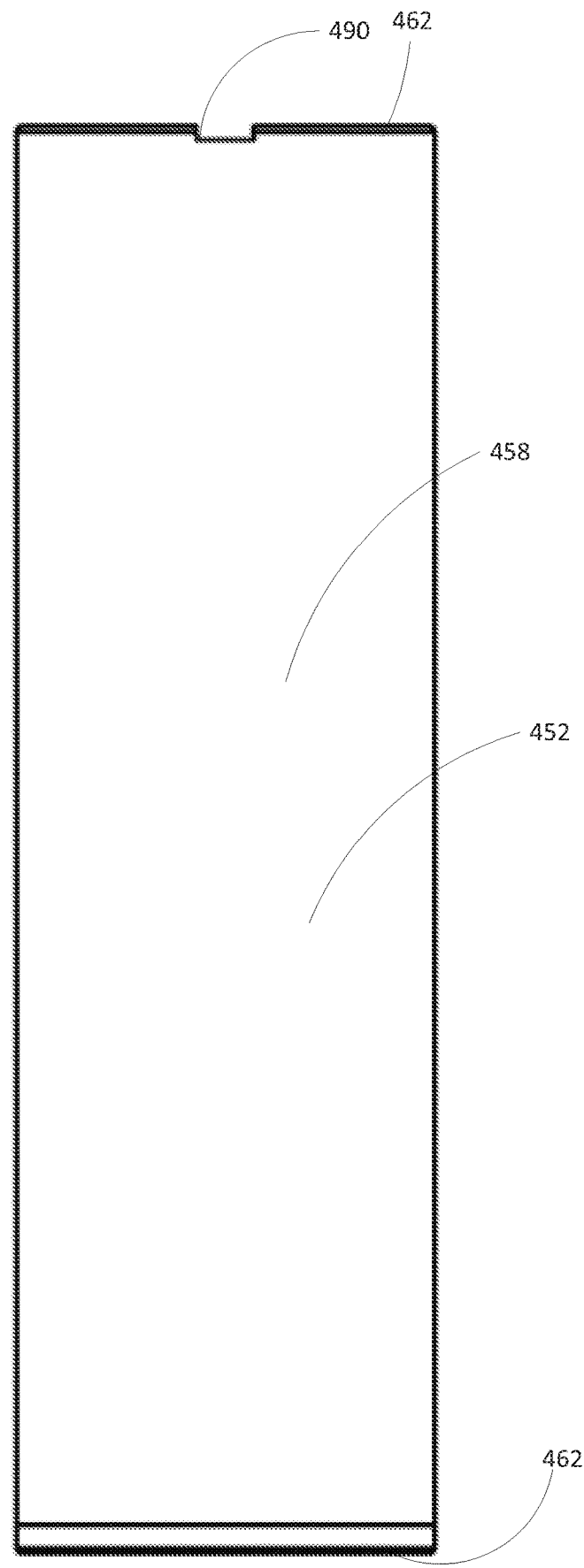
FIG. 21 is a fourth side view of the battery pack of FIG. 15.

As seen in FIG. 2, the axial alignment member 78 extends through the first end surface 62 at a joint portion 106 of sidewall 58 and the end surface 62. The groove 90 and the shoulder 94 are generally arranged about a central plane of the housing 54. The grooves 82A, 82B partially overlap with the groove 90, and the shoulder 94 is aligned with the groove 90.

The housing 54 further defines a number terminal grooves 110 extending axially along a portion of the sidewall 58 and through the joint portion 106 of the first end surface 62. In the illustrated embodiment, the battery pack 50 includes four terminal grooves 110A, 110B, 110C, 110D separated by the first insertion alignment member 78 and the second insertion alignment member 86.

A corresponding number of terminal contacts 114 (e.g., four terminal contacts 114A, 114B, 114C, 114D) are supported in the terminal grooves 110A, 110B, 110C, 114D. The first terminal contact 114A is configured as a positive or charging terminal, the second terminal contact 114B is configured as a negative or discharging terminal, the third terminal contact 114C is configured as a ground terminal and the terminal contact 314D is configured as a thermistor contact. Each terminal is configured to facilitate the electrical coupling of the battery cell 74 to an electronic device or to a battery charger to provide or receive electrical power.

As illustrated, the terminal grooves 110A, 110B and the terminal contacts 114A, 114B are disposed on one side of the first insertion alignment member 78 and the second insertion alignment member 86, and the terminal grooves 110C, 110D and the terminal contacts 114C, 114D are disposed on the other side. Also, the illustrated terminal grooves 110A, 110B and 110C, 110D and terminal contacts 114A, 114B and 114C, 114D are symmetrical about the first insertion alignment member 78 and the second insertion alignment member 86.

In one embodiment, the housing 54 is a two piece housing assembly including a generally cylindrical casing providing the sidewall 58 and the first end surface 62 and an end cap providing the second surface 66. The battery cell 74 is inserted into the cavity 70 and sealed in place by coupling the end cap to the casing (e.g., via sonic welding, adhesive, interference fit, threaded connection, fasteners, etc.).

In another embodiment, the housing 54 is a two piece "clamshell" housing assembly (i.e., a housing split generally symmetrically along an axial direction). The battery cell 74 is inserted into the cavity 70 defined by the housing pieces and sealed in place by coupling the housing pieces together (e.g., via sonic welding, adhesive, interference fit, threaded connection, fasteners, etc.).

In one embodiment, the battery cell 74 is a single lithium-ion battery cell having a nominal voltage of approximately 3.6 V to 4.4 V and, in one specific embodiment, 4.2 V. In other constructions (not shown), the pack 50 may include more than one battery cell connected in series, parallel or combination series-parallel. The nominal voltage of the pack 50 may be varied to meet the requirement of specific applications. In other constructions (not shown), the battery cell(s) 74 may have a different chemistry, nominal voltage, etc.

FIGS. 8-14 illustrate an alternative construction of a battery pack 250. The battery pack 250 is similar to the battery pack 50 shown in FIGS. 1-7, and common elements have the same reference number plus "200". This description will focus on aspects of the battery pack 250 different than the battery pack 50. It should be noted, however, that features of the battery pack 250 may be incorporated or substituted into the battery pack 50 or vice versa.

The battery pack 250 includes a cylindrical housing 254 with an axial insertion alignment member 278 defined by a pair of axial grooves 282A, 282B, and a radial insertion alignment member 286 defined by a radial groove 290. In the illustrated embodiment, the first groove 282A has a first width (e.g., approximately 2 mm) and the second groove 282B has a different second width (e.g., approximately 3 mm). The grooves 282A, 282B are arranged to at least partially overlap with the groove 290 of the second alignment member 286. The shoulder 294 is aligned with the groove 290 but offset from the central plane of the battery pack 250.

The housing 254 defines a number of terminal grooves 310 (e.g., three terminal grooves 310A, 310B, 310C) supporting a corresponding number of terminal contacts 314 (e.g., three terminal contacts 314A, 314B, 314C). The terminal grooves 310A, 310B and the terminal contacts 314A, 314B are separated from the terminal groove 310C and the terminal contact 314C by the axial alignment member 278 and the radial alignment member 286. In addition, the terminal grooves 310A, 310C and the terminal contacts 314A, 314C are symmetrical about the axial alignment member 278 and the radial alignment member 286.

The terminal contact 314A is configured as a positive terminal or charging terminal, the terminal contact 314B is configured as a negative or discharging terminal, and the third terminal contact 314C is configured as a thermistor or ground terminal. Each terminal contact 314 is configured to facilitate the electrical coupling of the battery cell 274 to an electronic device or battery charger to provide or receive electrical power.

FIGS. 15-21 illustrate another alternative construction of a battery pack 450. The battery pack 450 is similar to the battery packs 50, 250 shown in FIGS. 1-7 and 8-14, respectively, and common elements have the same reference number plus "400". This description will focus on aspects of the battery pack 450 different than the battery pack 50, 250. It should be noted, however, that features of the battery pack 450 may be incorporated or substituted into the battery pack 50, 250 or vice versa.

The battery pack 450 includes a cylindrical housing 454 with an axial alignment member 478 defined by a pair of grooves 482A, 482B and a radial alignment member 486 defined by a groove 490. In the illustrated embodiment, the first groove 482A has a first width (e.g., approximately 2 mm), and the second groove 482B has a different, second width (e.g., approximately 3 mm).

The housing 454 defines a number of terminal grooves 510 (e.g., four terminal grooves 510A, 510B, 510C, 510D) supporting a corresponding number of terminal contacts 514 (e.g., four terminal contacts 514A, 514B, 514C, 514D). The terminal grooves 510A, 510B and the terminal contacts 514A, 514B are separated from the terminal grooves 510C, 510D and the terminal contacts 514C, 514D by the axial alignment member 478 and the radial alignment member 486. In addition, the terminal grooves 510 and the terminal contacts 514 are symmetrical about the radial alignment member 486. Each terminal contact 514 is configured to facilitate the electrical coupling of the battery cell 474 to an electronic device or to a battery charger to provide or receive electrical power.

FIGS. 22-28 illustrate another alternative construction of a battery pack 450. The battery pack 650 is similar to the battery packs 50, 250, 450 shown in FIGS. 1-7, 8-14 and 15-21, respectively, and common elements have the same reference number plus "600". This description will focus on aspects of the battery pack 650 different than the battery pack 50, 250, 450. It should be noted, however, that features of the battery pack 650 may be incorporated or substituted into the battery pack 50, 250, 450 or vice versa.

The battery pack 650 includes a cylindrical housing 654 with an axial alignment member 678 defined by a pair of grooves 682A, 682B and a radial alignment member 686 defined by a groove 690. In the illustrated embodiment, the grooves 682A, 682B have the same width (e.g., approximately 2 mm) and are separated by a shoulder 694.

In the illustrated construction, the groove 690 of the radial alignment member 686 does not extend completely across the first surface 662. Rather, the illustrated groove 690 extends from one circumferential edge of the first surface 662 and across a portion (e.g., about 60% to 75%) of the diameter of the battery pack 650. In addition, the end 696 of the groove 690 is non-straight and, as illustrated, has a number of surfaces meeting at an angle.

The housing 654 defines a number of terminal grooves 710 (e.g., three terminal grooves 710A, 710B, 710C) supporting a corresponding number of terminal contacts 714 (e.g., three terminal contacts 714A, 714B, 714C). Each terminal groove 710 has a polygonal shape.

The terminal groove 710A and the terminal contact 714A are separated from the terminal groove 710C and the terminal contact 714C by the axial alignment member 678 and the radial alignment member 686. In addition, the terminal grooves 710 and the terminal contacts 714 are symmetrical about the radial alignment member 686, with the terminal groove 710B and the terminal 714B being aligned with the groove 690 of the radial alignment member 686. Each terminal contact 714 is configured to facilitate the electrical coupling of the battery cell 674 to an electronic device or to a battery charger to provide or receive electrical power.

Figure 29:
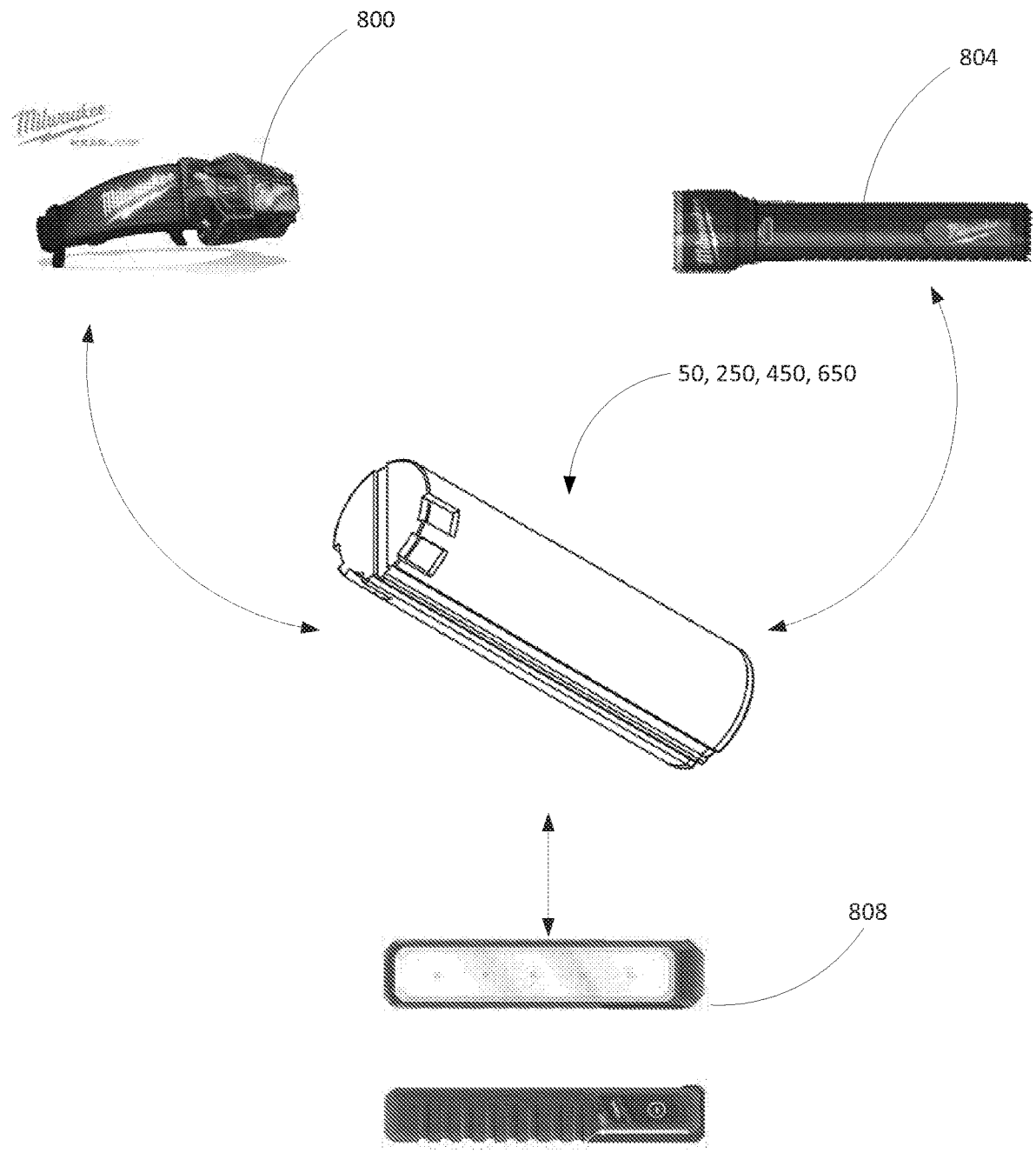
FIG. 29 illustrates the battery pack and a plurality of electrically-powered devices with which the battery pack is configured to be used.

FIG. 29 illustrates the battery pack 50, 250, 450, 650 and a number of exemplary electronic devices configured to receive the battery pack 50, 250, 450, 650. The illustrated electronic devices include a headlamp 800, a flashlight 804, and a flood light 808. However, it should be noted that the battery pack 50, 250, 450, 650 may be used with a variety of electronic devices including, for example, non-motorized devices, such as lighting devices, cameras (e.g., an inspection scope, etc.), audio devices (e.g., headphones, speakers, etc.), etc., and motorized devices such as power tools (e.g., a screwdriver, a drill, etc.), vacuums, fans, etc.

Each device 800, 804, 808 includes a receiving portion or port 812 configured to electrically and mechanically receive the battery pack 50, 250, 450, 650. The receiving port 812 includes device electrical contacts 816 engageable with the battery pack terminal contacts 114, 314, 514, 714 to electrically couple the electronic device 800, 804, 808 with the battery pack 50, 250, 450, 650. The illustrated device contacts 816 are disposed on or in a protrusion 820 configured to mate with the terminal grooves 110, 310, 510, 710 of the battery pack 50, 250, 450, 650 to facilitate electromechanical coupling.

Figure 30:
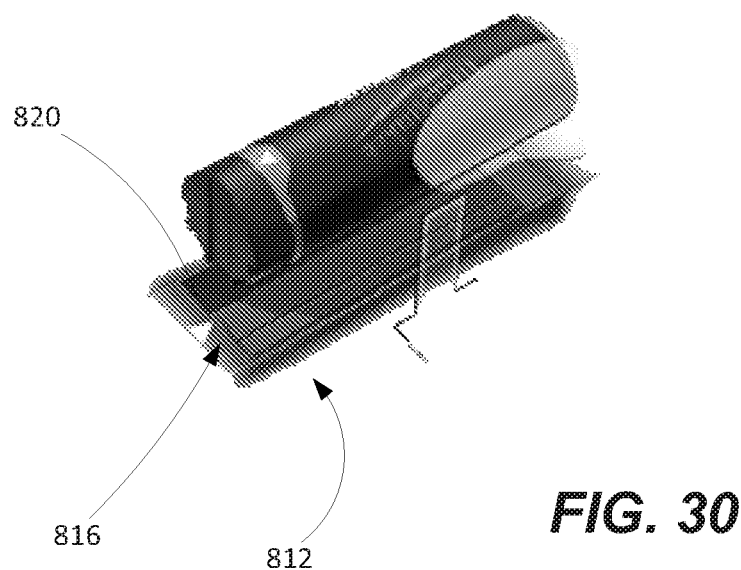
FIG. 30 is a perspective view of a receiving portion of an exemplary first electrically-powered device configured to receive the battery pack in a first (e.g., radial) direction.

FIG. 30 illustrates a receiving port 912 of an electronic device (e.g., the headlamp 800 or the flood light 808) configured to receive the battery pack 50, 250, 450, 650 in a radial direction. The receiving port 912 is defined by a cavity 924 and includes a first battery alignment member 928 and a second battery alignment member 932.

The first battery alignment member 928 includes structure complementary to the first insertion alignment member 78, 278, 478, 678 of the battery pack 50, 250, 450, 650 to be received in the port 912. In the illustrated construction, the alignment member 928 includes one or more protrusions or rails 936 sized and shaped to mate with the alignment member 78, 278, 478, 678.

Similarly, the second battery alignment member 932 includes structure complementary to the second insertion alignment member 86, 286, 486, 686 of the battery pack 50, 250, 450, 650 to be received in the port 912. The illustrated alignment member 932 includes a protrusion or rail 940 sized and shaped to mate with the alignment member 86, 286, 486, 686.

In a tool configured for insertion of the battery pack 50, 250, 450, 650 in a radial direction, the second battery alignment member 932 facilitates insertion of the battery pack 50, 250, 450, 650 while the first battery alignment member 928 receives the first insertion alignment member 78, 278, 478, 678 which would otherwise act as a "lock out" feature. That is, the first insertion alignment member 78, 278, 478, 678 receives the first battery alignment member 932 to allow the battery inserted into the receiving port 912 thereby facilitating electromechanical coupling of the electrical contacts 816 and the terminal contacts 114, 314, 514, 714.

Figure 31:
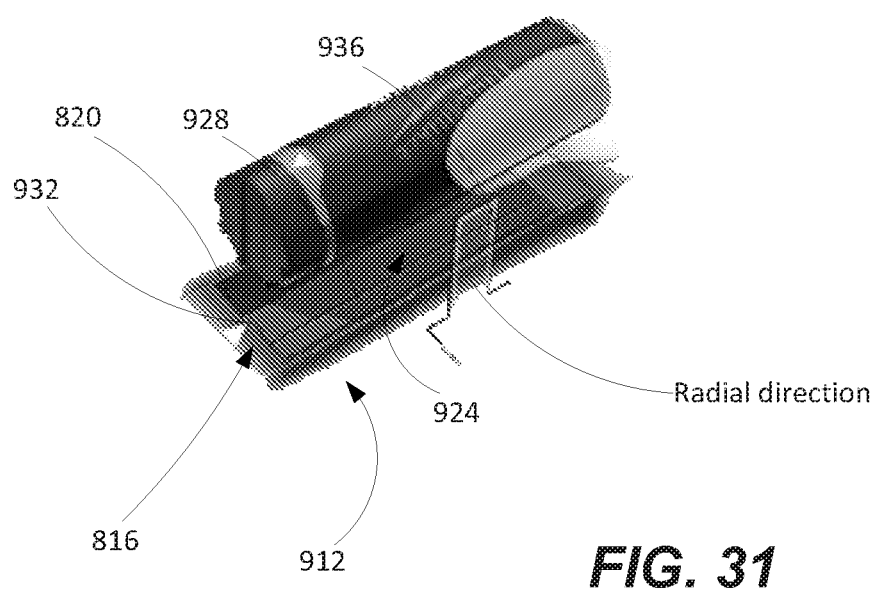
FIG. 31 is a perspective view illustrating insertion of the battery pack into the receiving portion illustrated in FIG. 30.

FIG. 31 illustrates insertion of the battery pack 50, 250, 450, 650 into the receiving port 912 shown in FIG. 30. As illustrated, the battery pack 50, 250, 450, 650 is aligned with the receiving port 912 such that the second insertion alignment member 86, 286, 486, 686 receives the second battery alignment member 932. This facilitates sliding engagement of the battery pack 50, 250, 450, 650 into the receiving port 912 in the radial direction. The battery pack 50, 250, 450, 650 slides in the radial direction until the first battery alignment member 928 is received within the first insertion alignment member 78, 278, 478, 678. When the first battery alignment member 928 is received by the first insertion alignment member 78, 278, 478, 678, the terminal grooves 110, 310, 510, 710 receive the protrusions 820 such that the electrical contacts 816 engage the terminal contacts 114, 314, 514, 714 to complete the electromechanical coupling of the battery pack 50, 250, 450, 650 to the electronic device.

In the event that battery pack 50, 250, 450, 650 is improperly aligned relative to the receiving port 912, the second battery alignment member 932 prevents insertion of the battery pack 50, 250, 450, 650 into the receiving port 912. In the event that the second battery alignment member 932 and the second insertion alignment member 86, 286, 486, 686 are properly aligned, but the first battery alignment member 928 and the first insertion alignment member 78, 278, 478, 678 are misaligned (i.e., the battery pack 50, 250, 450, 650 is rotated 180° relative to the position shown in FIG. 24), the battery pack 50, 250, 450, 650 will be prevented from full insertion and electromechanical coupling within the receiving port 912 by the protrusion 936 of the first battery alignment member 928. Furthermore, if a user attempts to use a battery pack (not shown) without either the first insertion alignment member 78, 278, 478, 678 or the second insertion alignment member 86, 286, 486, 686 (or both), the first battery alignment member 928 and the second battery alignment member 932 will prevent insertion and electromechanical coupling thereby collectively (or individually) defining a "lock out" feature.

In addition, if a user attempts to use a battery pack (not shown) with the first insertion alignment member 78, 278, 478, 678 or the second insertion alignment member 86, 286, 486, 686 (or both) having a structure that is not complementary to the first battery alignment member 928 and the second battery alignment member 932 (e.g., having a non-complementary shape, size, position, orientation, etc.) or vice versa, the first battery alignment member 928 and the second battery alignment member 932 will prevent insertion and electromechanical coupling. For example, if the battery pack 650 with the partial groove 690 is used with a device (not shown) with a projection to be received by a battery pack with a groove completely across the first surface (e.g., the battery pack 50, 250, 450 with the groove 90, 290, 490), such a projection 940 for the second battery alignment member 932 would engage the end 696 of the groove 690 to prevent full radial insertion of the battery pack 650 and engagement of the device contacts 816 and the battery contacts 714.

Figure 32:
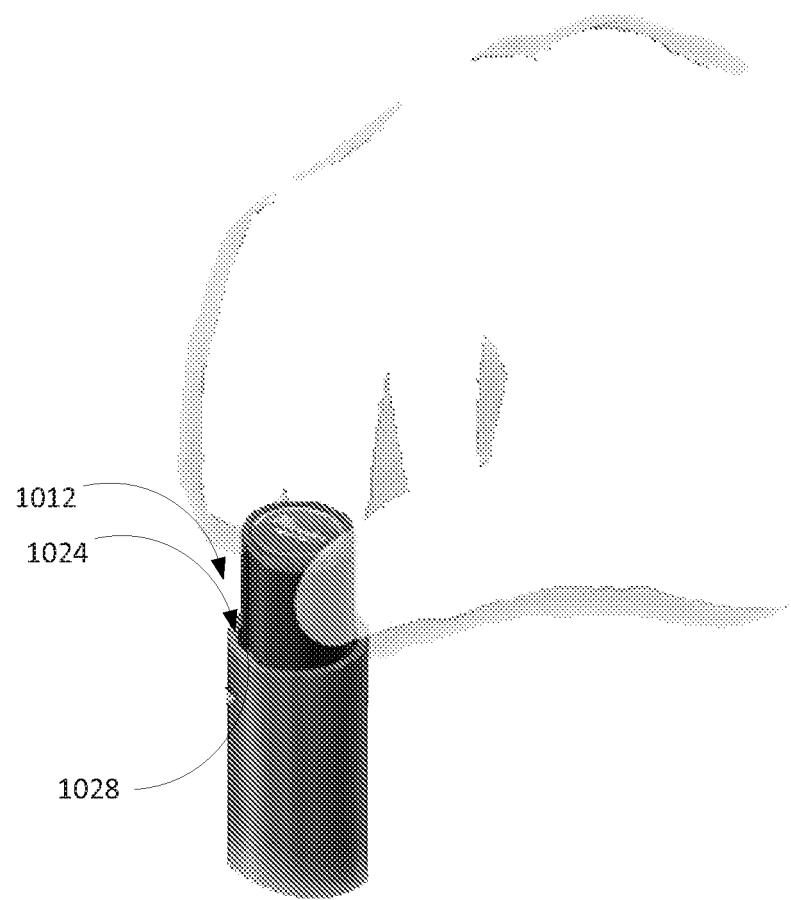
FIG. 32 is a perspective view of a receiving portion of another exemplary electrically-powered device configured to receive the battery pack in a different, second (e.g., axial) direction.

FIG. 32 illustrates a receiving port 1012 of an electronic device (e.g., the flashlight 804) configured to receive the battery pack 50, 250, 450, 650 in an axial direction. The receiving portion 1012 is defined by a cavity 1024 and includes a first battery alignment member 1028 and a second battery alignment member 1032.

The first battery alignment member 1028 includes structure complementary to the first insertion alignment member 78, 278, 478, 678 of the battery pack 50, 250, 450, 650 to be received in the port 1012. The illustrated alignment member 1028 includes one or more protrusions or rails 1036 sized and shaped to mate with the first insertion alignment member 78, 278, 478, 678.

Similarly, the second battery alignment member 1032 includes structure complementary to the second insertion alignment member 86, 286, 486, 686 of the battery pack 50, 250, 450, 650 to be received in the port 1012. The illustrated alignment member 1032 is includes a protrusion or rail 1040 sized and shaped to mate with the second insertion alignment member 86, 286, 486, 686.

In a tool configured for insertion of the battery pack 50, 250, 450, 650 in an axial direction, the first battery alignment member 1028 facilitates insertion of the battery pack 50, 250, 450, 650 via sliding engagement of the first battery alignment member 1028 and the first insertion alignment member 78, 278, 478, 678 while the second battery alignment member 1032 receives the second insertion alignment member 86, 286, 486, 686 which would otherwise act as a "lock out" feature. That is, the second insertion alignment member 86, 286, 486, 686 receives the second battery alignment member 1032 to allow the battery pack 50, 250, 450, 650 inserted into the receiving port 1012 thereby facilitating electromechanical coupling of the electrical contacts 816 and the terminal contacts 114, 314, 514, 714.

Figure 33:
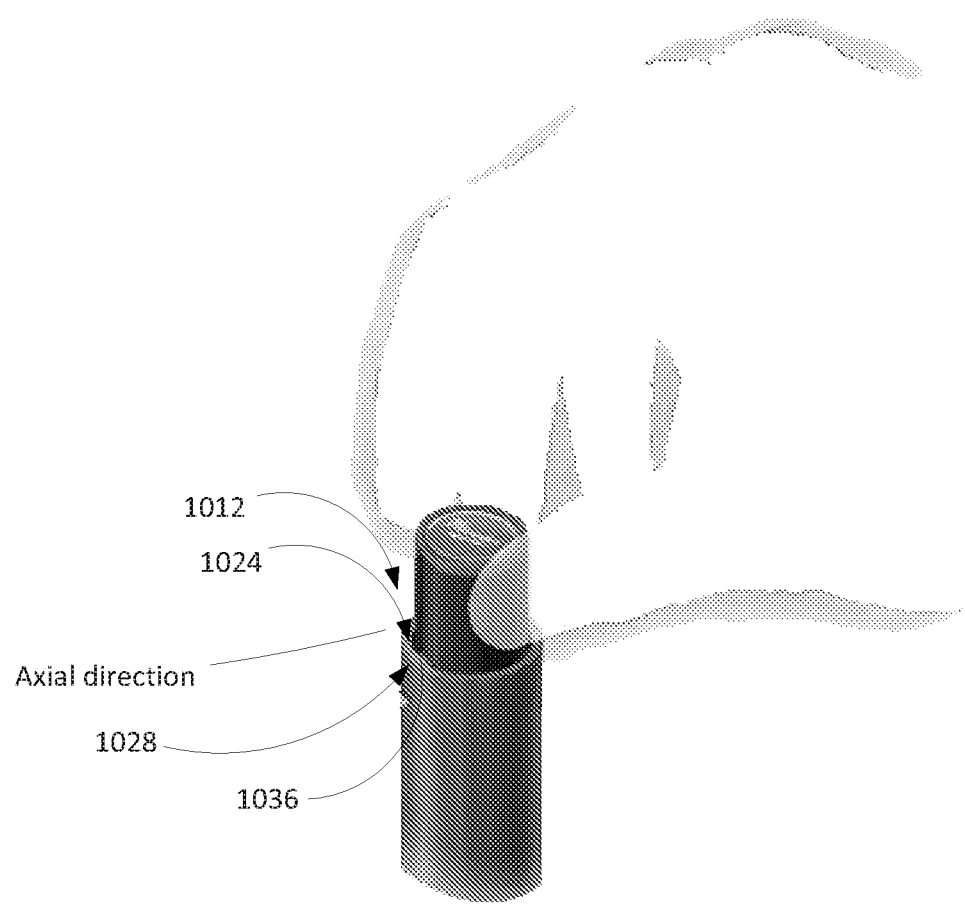
FIG. 33 is a perspective view illustrating insertion of the battery pack into the receiving portion FIG. 32.

FIG. 33 illustrates insertion of the battery pack 50, 250, 450, 650 into the receiving port 1012 shown in FIG. 32. As illustrated, the battery pack 50, 250, 450, 650 is aligned with the receiving port 1012 such that the first insertion alignment member 78, 278, 478, 678 receives the first battery alignment member 1028. This facilitates sliding engagement of the battery pack 50, 250, 450, 650 into the receiving port 1012 along the axial direction. The battery pack 50, 250, 450, 650 slides along the axial direction until the second battery alignment member 1032 is received within the second insertion alignment member 86, 286, 486, 686. When the second battery alignment member 1032 is received within the second insertion alignment member 86, 286, 486, 686, the terminal grooves 110, 310, 510, 710 receive the protrusions 820 such that the electrical contacts 816 engage the terminal contacts 114, 314, 514, 714 to complete the electromechanical coupling of the battery pack 50, 250, 450, 650 to the electronic device.

In the event that battery pack 50, 250, 450, 650 is improperly aligned relative to the receiving port 1012, the first battery alignment member 1028 prevents insertion of the battery pack 50, 250, 450, 650 into the receiving port 1012. Furthermore, if a user attempts to use a battery pack 50, 250, 450, 650 without either the first insertion alignment member 78, 278, 478, 678 or the second insertion alignment member 86, 286, 486, 686 (or both), the first battery alignment member 1028 and the second battery alignment member 1032 will prevent insertion and electromechanical coupling thereby collectively (or individually) defining a "lock out" feature.

In addition, if a user attempts to use a battery pack (not shown) with the first insertion alignment member 78, 278, 478, 678 or the second insertion alignment member 86, 286, 486, 686 (or both) having a structure that is not complementary to the first battery alignment member 1028 and the second battery alignment member 1032 (e.g., having a non-complementary shape, size, position, orientation, etc.) or vice versa, the first battery alignment member 1028 and the second battery alignment member 1032 will prevent insertion and electromechanical coupling. For example, if the battery pack 650 with the partial groove 690 is used with a device (not shown) with a projection to be received by a battery pack with a groove completely across the first surface (e.g., the battery pack 50, 250, 450 with the groove 90, 290, 490), such a projection 940 for the second battery alignment member 932 would engage structure of the top surface 662 outside the groove 690 to prevent full axial insertion of the battery pack 650 and engagement of the device contacts 816 and the battery contacts 714.

Figure 34:
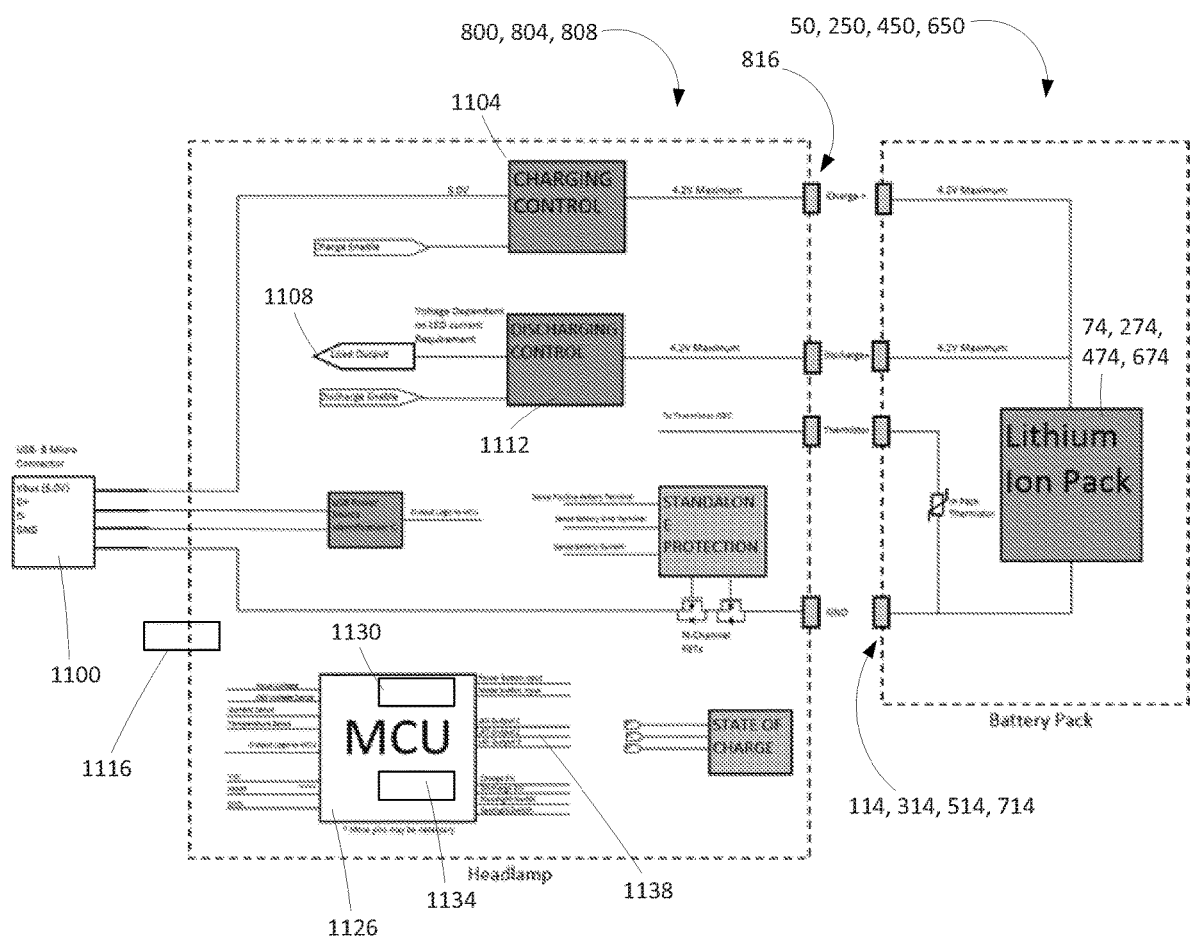
FIG. 34 is a circuit schematic of the battery pack coupled to an electrically-powered device.

FIG. 34 illustrates an exemplary circuit schematic of the battery pack 50, 250, 450, 650 coupled to one of the electronic devices via engagement between the electrical contacts 816 and the terminal contacts 114, 314, 514, 714. As illustrated, the electronic device includes a charging connector 1100 (e.g., a USB-B micro connector) configured to be coupled to an external power source to provide charging current to the battery pack 50, 250, 450 to charge the battery pack 50, 250, 450, 650 via a charging control 1104. In addition, the electronic device includes a load output 1108 (e.g., a light, a speaker, a motor, etc.) configured to receive discharge power from the battery pack 50, 250, 450, 650 via a discharging control 1112. The electronic device may be powered on and off via one or more actuators 1116 (e.g., a button, switch, trigger, etc.) such that the load output 1120 draws energy from the battery pack 50, 250, 450, 650.

The electronic device also includes a microcontroller 1126 including at least a memory 1130 configured to store software-based instructions and a processor 1134 configured to execute the software. The microcontroller 1126 may, for example, be configured to control operational parameters of the load output 1108, direct charging and discharging protocols for the battery pack 50, 250, 450, 650, identify when the electronic device is connected to an external power source, and apply protection protocols for the battery pack 50, 250, 450, 650/electronic device in addition to monitoring the battery pack temperature (via electrical coupling with the thermistor), current, cell voltage, input voltage (from the external power source), and the state of charge of the battery pack 50, 250, 450, 650. The protection protocols may include terminating charging or discharging of the battery based on the monitored features (e.g., pack temperature reaches a threshold value, cell voltage reaches a threshold value, etc.). In addition, the microcontroller 1126 may be configured to activate one or more indicators 1138 (e.g., LEDs, etc.) to indicate an operational state of the battery pack 50, 250, 450, 650 or the electronic device.

As illustrated in FIG. 34, the battery pack 50, 250, 450, 650 is configured to be charged via the electronic device when the electronic device is coupled to an external power source. However, the battery pack 50, 250, 450, 650 may also be charged via a dedicated charger (not shown) including similar features as the electronic device. In other embodiments, the pack 50, 250, 450, 650 may include features of the device (e.g., charging/discharging control, microcontroller, charging connector, etc.) such that the battery pack 50, 250, 450, 650 may be directly coupled to an external power source.

The illustrated battery pack 50, 250, 450, 650 and corresponding electrical devices may embody many advantageous characteristics. The battery pack 50, 250, 450, 650 is configured to be used with multiple tools having receiving ports configured to facilitate guided insertion of the battery pack 50, 250, 450, 650 in the radial direction or in the axial direction. In addition, the engagement between the first and second insertion alignment member and the first and second battery alignment member ensure that only battery packs 50, 250, 450, 650 configured to be used with the electronic devices are properly received within the receiving port 912, 1012. This prevents battery packs (not shown) that may be inoperable with the electronic device or that may damage the electronic device from being used.

One or more independent features and/or independent advantages of the invention may be set forth in the following claims.

What is claimed is:

1. A battery pack comprising:
   a housing extending along an axis;
   a battery cell positioned in the housing;
   a first insertion alignment member disposed on the housing guiding insertion of the battery pack into a first electronic device in a first direction relative to the axis; and
   a second insertion alignment member guiding insertion of the battery pack into a second electronic device in a different, second direction relative to the axis.

2. The battery pack of claim 1, wherein the first direction is a radial direction relative to the axis of the battery pack.

3. The battery pack of claim 1, wherein the second direction is an axial direction relative to the axis of the battery pack.

4. The battery pack of claim 1, wherein the first insertion alignment member cooperates with a complementary first alignment member on the first electronic device to guide insertion of the battery pack into the first electronic device.

5. The battery pack of claim 1, further comprising battery pack terminals electrically coupled to the battery cell and operable to interface with and to electrically couple the battery cell to device terminals of each of the first electronic device and the second electronic device.

6. The battery pack of claim 5, wherein the first insertion alignment member cooperates with a second lockout member on the second electronic device to facilitate engagement of the battery pack terminals with the device terminals of the second electronic device.

7. The battery pack of claim 1, wherein the first insertion alignment member includes a groove or a protrusion.

8. The battery pack of claim 7, wherein the housing has an axial surface, and wherein the groove of the first insertion alignment member is defined on the axial surface.

9. The battery pack of claim 1, wherein the second insertion alignment member includes a groove or a protrusion.

10. The battery pack of claim 9, wherein the housing has a circumferential surface, and wherein the groove of the second insertion alignment member is defined on the circumferential surface.

11. The battery pack of claim 1, wherein the housing has a first surface, a second surface, and a sidewall extending therebetween, the first insertion alignment member being disposed on the first surface, the second insertion alignment member being disposed on the sidewall.

12. The battery pack of claim 11, further comprising battery pack terminals electrically coupled to the battery cell and operable to interface with and to electrically couple the battery cell to device terminals of each of the first electronic device and the second electronic device, the battery pack terminals being disposed proximate an intersection of the sidewall and the first surface.

\* \* \* \* \*